(12) United States Patent
Anand et al.

(10) Patent No.: US 8,879,550 B2
(45) Date of Patent: Nov. 4, 2014

(54) METHOD AND APPARATUS FOR PACKET CLASSIFICATION

(75) Inventors: Prashant Anand, Bangalore (IN); Ramanathan Lakshmikanthan, Santa Clara, CA (US); Sun Den Chen, San Jose, CA (US); Ning Xu, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 379 days.

(21) Appl. No.: 13/466,984

(22) Filed: May 8, 2012

(65) Prior Publication Data

US 2013/0301641 A1     Nov. 14, 2013

(51) Int. Cl.
    *H04L 12/28*     (2006.01)

(52) U.S. Cl.
    USPC .......................................... 370/389; 370/392

(58) Field of Classification Search
    CPC ............. H04J 3/07; H04J 3/073; H04J 3/076; H04W 24/00; H04L 43/50; H04L 43/0852; H04L 43/08; H04L 49/1515; H04L 49/1523; H04L 49/153; H04L 12/56; H04L 2012/56; H04L 29/06095; H04L 49/3009
    USPC ............ 370/252, 388–389, 392, 395.31, 400, 370/506
    See application file for complete search history.

(56) References Cited

U.S. PATENT DOCUMENTS

| 7,061,874 | B2 | 6/2006 | Merugu et al. |
| 7,227,842 | B1 * | 6/2007 | Ji et al. .......................... 370/235 |
| 7,415,012 | B1 | 8/2008 | Mankins |
| 7,881,291 | B2 | 2/2011 | Grah |
| 2005/0254502 | A1 | 11/2005 | Choi |

OTHER PUBLICATIONS

Choi L. et al. "Scalable Packet Classification Through Rulebase Partitioning Using the Maximum Entropy Hashing", IEEE/ACM Transactions on Networking, Dec. 1, 2009, pp. 1926-1935, vol. 17, No. 6, New York, NY, US.

* cited by examiner

*Primary Examiner* — Kwang B Yao
*Assistant Examiner* — Syed M Bokhari

(57) ABSTRACT

In one aspect, the present invention reduces the amount of low-latency memory needed for rules-based packet classification by representing a packet classification rules database in compressed form. A packet processing rules database, e.g., an ACL database comprising multiple ACEs, is preprocessed to obtain corresponding rule fingerprints. These rule fingerprints are much smaller than the rules and are easily accommodated in on-chip or other low-latency memory that is generally available to the classification engine in limited amounts. The rules database in turn can be stored in off-chip or other higher-latency memory, as initial matching operations involve only the packet key of the subject packet and the fingerprint database. The rules database is accessed for full packet classification only if a tentative match is found between the packet key and an entry in the fingerprint database. Thus, the present invention also advantageously minimizes accesses to the rules database.

26 Claims, 13 Drawing Sheets

ACL Family Type = IPv4, ACL name=XYZ

{

| Rule/ACE Index | SrcIP | DestIP | SrcPort | DestPort |
|---|---|---|---|---|
| Rule/ACE 1- | 10.1.1.0/24 | 15.1.2.3 | * | 80 |
| Rule/ACE 2- | 10.1.1.5 | 15.1.2.5 | 80-84 | 85 |
| Rule/ACE 2- | 202.1.1.5 | * | * | GT 1023 |
| ⋮ | | | | |
| Rule/ACE N- | ---------------------------------------------------- | | | |

}

Example ACL

*PRIOR ART*
*FIG. 3*

50
(EXAMPLE CHARACTERISTIC BITS)

52
(EXAMPLE CUT-POINT BITS)

METHOD AND APPARATUS FOR PACKET CLASSIFICATION

TECHNICAL FIELD

The present invention generally relates to data networks, and particularly relates to packet classification in data networks.

BACKGROUND

Access Control Lists (ACLs) are a commonly used approach to filtering IP traffic. ACLs comprise lists of rules referred to as Access Control Entries (ACEs). In an example case, the ACEs map inbound packets to outbound ports as a function of source and destination addresses, and indicate whether given inbound packets should be permitted (routed) or denied (discarded). Of course, ACLs can be used for other purposes, including Network Address Translation (NAT) processing, policy-based routing, etc.

With the increasing "intelligence" of IP networks, such as those implemented in the latest telecommunication networks, there is an increasing need for more sophisticated packet classification, security filtering, policy routing, packet redirecting for service chain processing, OpenFlow processing switches, etc. "OpenFlow" is an open interface that provides remote control of the forwarding tables in network routers, switches, and access points, and thus allows dynamic control of network behavior, policies, etc.

As might be imagined, the number of ACEs needed in an ACL can be quite large. It is not uncommon for an ACL to include more than a thousand ACEs, e.g., up to four thousand or more ACEs. Moreover, there may be different ACLs for different activities and for different protocol families, e.g., each ACL "bind point" in the data plane corresponds to a different protocol family type, like IPv4, IPv6, Virtual LANs (VLANs), Multi-Protocol Label Switching (MPLS), etc. The total number of rules across all ACLs implemented in a network switch or router can be quite large, e.g., well over a hundred thousand.

ACL-based search types include Longest Prefix Match (LPM), such as are used for Source IP-IPv4/IPv6, Destination IP-IPv4/IPv6), exact match searching, which is used for protocols or flags, and range matching, which is used for TCP/UDP source port and destination port. In this regard, the Ternary CAM (TCAM) is a specialized type of Content Addressable Memory (CAM) that is designed for rapid table lookups, based on packets passing through a switch or router. However, there generally are significant power, cost, and space constraints governing the amount of TCAM available for fast searching of large ACLs and/or large numbers of ACLs.

Other approaches include algorithmic solutions such as Modified Recursive Flow Classification (MRFC). Characteristically, however, MRFC-based solutions require many external memory accesses, because the large amount of memory needed in MRFC processing typically does not fit into the on-chip memories of digital processors used as routing engines. Another issue is that MRFC does not appear to work as well with wider packet "keys," which are becoming more prevalent as IPv6 usage increases.

SUMMARY

In one aspect, the present invention reduces the amount of low-latency memory needed for rules-based packet classification by representing a packet classification rules database in compressed form. A packet processing rules database, e.g., an ACL database comprising multiple ACEs, is preprocessed to obtain corresponding rule fingerprints. These rule fingerprints are much smaller than the rules and are easily accommodated in on-chip or other low-latency memory that is generally available to the classification engine in limited amounts. The rules database in turn can be stored in off-chip or other higher-latency memory, as initial matching operations involve only the packet key of the subject packet and the fingerprint database. The rules database is accessed for full packet classification only if a tentative match is found between the packet key and an entry in the fingerprint database. Thus, the present invention also advantageously minimizes accesses to the rules database.

In one embodiment, a method of packet classification in a network node includes obtaining a packet key corresponding to a data packet received by the network node, and identifying a packet processing rule or rules that are possible matches for the packet key by comparing "characteristic bits" of the packet key to rule fingerprints in a fingerprint database. The fingerprint database serves as a compressed representation of a rules database that comprises a set of packet processing rules. The rule fingerprints comprise "cut-point bits" corresponding to bit positions in the packet processing rules that operate as search cut-points distinguishing between the rules or subsets of them. Thus, the characteristic bits of any given packet key are the bits that occupy bit positions corresponding to the cut-point bits.

The method further includes fetching the identified packet processing rule or rules from the rules database, comparing the packet key with the fetched rule or rules, and indicating a rule hit or miss in dependence on whether the packet key matches any of the fetched rule or rules. Of course, if no possibly matching rules are identified for the packet key from the fingerprint database, a rule miss is indicated. Such processing advantageously permits the processing engine to make accesses to the full packet processing rules database only after it first determines from the fingerprint database that there are one or more possibly matching rules.

Such an arrangement is advantageously implemented in a network node that is configured to route or switch packets in a packet network, based on packet classification. In an example embodiment, the network node includes one or more communication interfaces that are configured to receive incoming packets for routing or switching processing, and to send outgoing packets according to switching or routing decisions made with respect to the incoming packets according to packet classification processing performed by the network node.

In support of packet classification processing, the network node includes one or more processing circuits that are configured to perform said packet classification processing, based on being configured to obtain a packet key corresponding to a data packet received by the network node, and to identify a packet processing rule or rules that are possible matches for the packet key by comparing characteristic bits of the packet key to rule fingerprints in a fingerprint database that serves as a compressed representation of a rules database comprising a set of packet processing rules.

The rule fingerprints, which are much smaller in terms of their memory "footprint" than the rules themselves, comprise cut-point bits corresponding to bit positions in the packet processing rules that operate as search cut-points distinguishing between individual rules or subsets of them. Further, as previously explained, the characteristic bits of the packet key occupy bit positions corresponding to the cut-point bits. Thus, by comparing the characteristic bits to the cut-point bits, e.g., by traversing a search structure representing the cut-point bits as a function of the characteristic bit values, the one or more processing circuits can determine whether there are any packet processing rules that are possible matches for the packet key, without need for accessing the rules database.

Assuming that one or more possible matches are identified, the one or more processing circuits, which may be regarded as a "classification engine," are further configured to fetch the identified packet processing rule or rules from the rules database, compare the packet key with the fetched rule or rules, and indicate a rule hit or miss in dependence on whether the packet key matches any of the fetched rule or rules. In this regard, it will be appreciated that the fingerprint database processing also may result in the determination that none of the packet processing rules in the rules database is a possible match for the packet key. That is, fingerprint database processing may results in the identification of no possibly matching rules. In such cases, advantageously, the one or more processing circuits avoid accessing the rules database and return a "miss" indication, which may trigger packet discarding or other "miss" based processing.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 3 is a diagram of a known example of an Access Control List (ACL) data structure.

DETAILED DESCRIPTION

Figure 1:
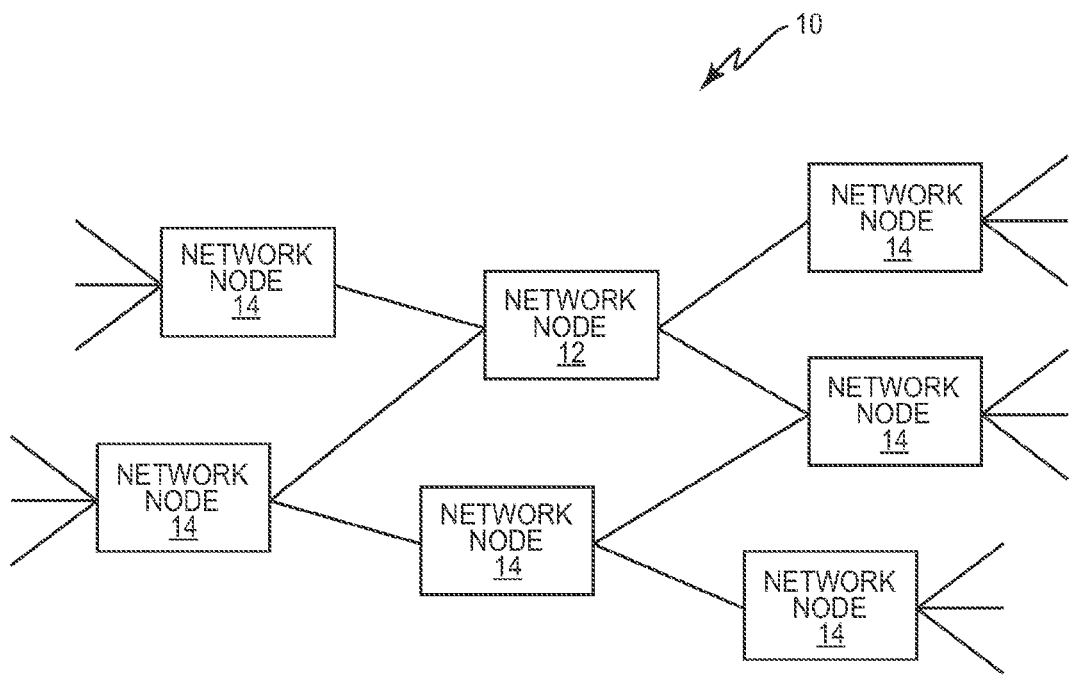
FIG. 1 is a partial block diagram of one embodiment of a packet data network having at least one node configured to perform packet classification using a fingerprint database of rule fingerprints in conjunction with a rules database of packet processing rules.

FIG. 1 is a partial block diagram of a packet data network 10 including one or more network nodes 12 and 14. At least the node 12 is configured according to the packet classification teachings presented herein, including the advantageous use of a fingerprint database as will be detailed by way of example in the following discussion. Of course, it may be that one or more of the nodes 14 are similarly configured. By way of non-limiting example, the network 10 is, for instance, an IP Multimedia Subsystem (IMS) used for delivering Internet Protocol (IP) multimedia services in a mobile communication network configured according to Third Generation Partnership Project (3GPP) protocol standards.

Figure 2:
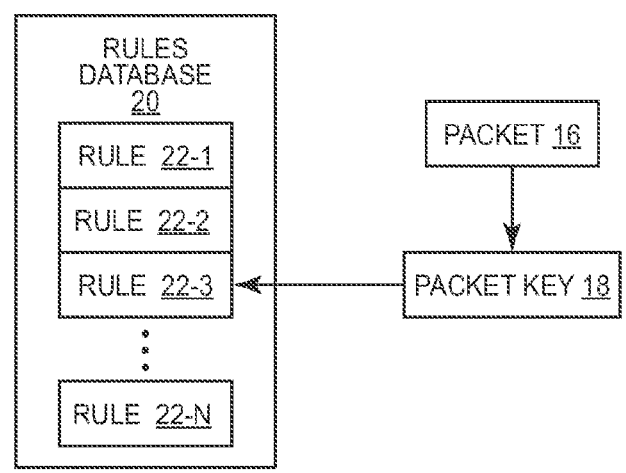
FIG. 2 is a diagram of one embodiment of a mapping between packets, packet keys and rules in a rules database.

With reference to FIG. 2, the nodes 12, 14 receive inbound packets 16. As is known, each inbound packet 16 includes a packet key 18, e.g., embedded in its header information, or the packet key 18 is derived by the node 12, 14 for the packet 16 from the packet header. The node 12, 14 processes each inbound packet 16 in accordance with a rules database 20 of packet processing rules 22, e.g., rules 22-1, 22-2, . . . , 22-N. Indeed, there may be multiple rules databases 20 corresponding to different protocol type and/or different packet processing functions (e.g., Quality-of-Service filtering, etc.), with each such database 20 containing a set of packet processing rules 22. For ease of discussion, however, reference is made to one rules database 20 with the understanding that the processing described herein directly extends to multiple rules database 20 and/or to the case where the illustrated rules database 20 can be understood as a superset or integration of multiple rules databases 20.

Further, while the rules database 20 as used herein may be structured in an advantageous manner, FIG. 3 illustrates a known example of an Access Control List (ACL), which is a type of rules database made up of rules referred to as Access Control Entries (ACEs). The ACL is activated for one or more node interfaces on which inbound packets 16 are received and it maps the inbound packets 16 to outbound (destination) ports based on the source and/or destination IP addresses of the inbound packets 16. Thus, different ACEs are activated in dependence on the source/destination IP addresses of the inbound packets 16 and the inbound packets 16 become corresponding outbound packets 16 (or are discarded) in accordance with the particular ACE(s) matched to the packet 16.

At least the node 12 departs from a conventional approach that performs the above-described packet classification processing based on making a direct comparison of the packet key 18 of an inbound packet 16 to a rules database 20, for identification of any matching packet processing rules 22. Instead, the node 12 uses a "fingerprint" based approach that greatly reduces the amount of low-latency memory needed to perform high-speed packet classification. In this regard, FIG. 4 presents an example arrangement of the node 12.

Figure 4:
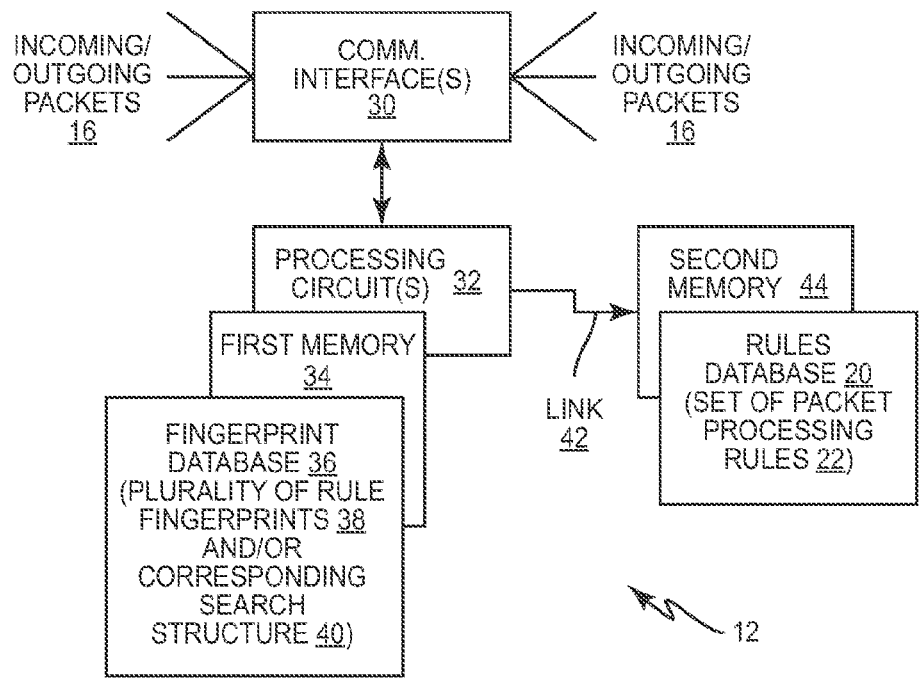
FIG. 4 is a block diagram of one embodiment of the at least one node introduced in FIG. 1, illustrating example functional circuit details for using a fingerprint database in a first memory and a corresponding rules database in a second memory.

In the example embodiment illustrated in FIG. 4, the network node 12 is configured to route or switch packets 16 in a packet network 10 based on packet classification. The example node 12 comprises one or more communication interfaces 30, one or more processing circuits 32, a first memory 34 (which may be one or more memory devices or circuits) storing a fingerprint database 36 of rule fingerprints 38 and/or a corresponding search structure 40 representing or otherwise embodying the fingerprint database 36. The one or more processing circuits 32 include a direct or indirect link 42 to a second memory 44 (which may be one or more memory devices or circuits) storing the rules database 20, which again comprises a set (or sets) of packet processing rules 22.

Figure 5:
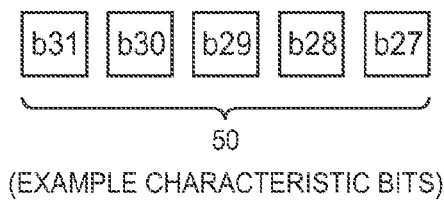
FIG. 5 is an example diagram of characteristic bits from a packet, such as are used herein for searching a fingerprint database to identify possibly matching packet processing rules in a corresponding rules database.
Figure 6:
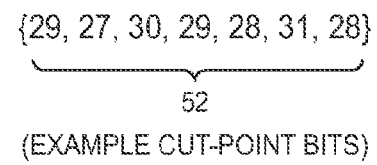
FIG. 6 is an example diagram of cut-point bits determined for a set of packet processing rules, such as are used to form rule fingerprints corresponding to the rules.

With reference to FIG. 5, the packet key 18 of a given inbound packet 16 includes a number of "characteristic bits" 50. In more detail, each packet key 18 will be understood as comprising a series of bits occupying respective bit positions that are ordered from a most-significant-bit (MSB) position to a least-significant-bit (LSB) position. As will be explained in detail later herein and as is introduced in FIG. 6, the packet processing rules 22 are processed according to the teachings herein to find "cut-point bits" 52 that distinguish between individual ones of the packet processing rules 22, or at least distinguish between subsets of the packet processing rules 22 within the rules database 20. Correspondingly, the characteristic bits 50 in each packet key 18 are those bits occupying bit positions corresponding to the bit positions of the cut-point bits 52 of the packet processing rules 22.

With these example details in mind, the node 12 is configured to receive incoming packets 16 for routing or switching processing, and to send (corresponding) outgoing packets 16 according to switching or routing decisions made with respect to the incoming packets 16 according to packet classification processing performed by the network node 12. Here, it will be appreciated that the switching or routing decisions made by the node 12 determine how and when an inbound packet 16 is mapped to a particular port of the node 12 as an outbound packet 16. Of course, such decisions also encompass packet discarding, wherein given inbound packets 16 are not sent from the node 12 as outbound packets 16 but rather are discarded because their packet keys 18 do not match any packet processing rules 22 defined at the node 12.

The node 12 includes one or more processing circuits 32 configured to perform packet classification processing, based on being configured to obtain a packet key 18 corresponding to a data packet 16 received by the network node 12. The packet key 18 may be included in or derived from packet header information, either by the one or more processing circuits 32 or by another processing circuit in the node 12. Regardless, the packet key 18 is used by the one or more processing circuits 32 in conjunction with the fingerprint database 36 to identify a packet processing rule 22 or rules 22 that are possible matches for the packet key 18.

The identification of possibly matching packet processing rule(s) 22 is done by comparing characteristic bits 50 of the packet key 18 to the rule fingerprints 38 in the fingerprint database 36, which serves as a compressed representation of the rules database 20. Of course, the rules database 20 includes the actual packet processing rules 22 that control the classification and processing of inbound packets 16. The rule fingerprints 38 are smaller than the packet processing rules 22 as they comprise cut-point bits 52 corresponding to bit positions in the packet processing rules 22 that operate as search cut-points distinguishing between individual rules 22 or subsets of them.

As noted, the characteristic bits 50 of the packet key 18 occupy bit positions corresponding to the cut-point bits 52, and this allows the one or more processing circuits 32 to determine whether any of the packet processing rules 22 in the rules database 20 are possible matches for a given packet key 18 simply by accessing the fingerprint database 36 or, equivalently, evaluating a search structure 40 which embodies or otherwise represents the fingerprint database 36. For example, the search structure 40 includes nodes corresponding to the cut-point bits 52 and the search structure 40 is traversed as a function of the binary values of the characteristic bits 50 in the packet key 18 being evaluated.

Assuming that such processing results in the identification of one or more packet processing rules 22 that are possible matches for the packet key 18, the one or more processing circuits 32 are configured to fetch the identified packet processing rule 22 or rules 22 from the rules database 20, and to compare the packet key 18 with the fetched rule 22 or rules 22. Correspondingly, the one or more processing circuits 32 are configured to indicate a rule hit or miss dependent upon whether the packet key 18 matches any of the fetched rule 22 or rules 22. It will be appreciated that this indication drives the processing applied to the packet 16 in question—e.g., with a rule hit, packet processing circuitry within the node 12 processes the packet 16 according to the matching packet processing rule 22, and with a rule miss, the packet processing circuitry discards the packet 16, or takes other miss-based action.

With the above in mind, it will be appreciated that in at least one embodiment the one or more processing circuits 32 are configured to classify a given received packet 16 for switching or routing as a corresponding outgoing packet 16, based on processing the given received packet 16 according to the fetched packet rule 22 matching the packet key 18 of the given received packet 16. In the same or in other embodiments, the one or more processing circuits 32 comprise a digital processing circuit that is configured to perform the identification of the packet processing rule 22 or rules that possibly match the packet key 18, and to perform the comparison of the fetched rule 22 or rules with the packet key 18. The digital processing circuit may comprise one or more microprocessors or other fixed or programmable processing circuitry. In at least one embodiment, the one or more processing circuits 32 comprise a microprocessor-based circuit that is configured according to the teachings herein based at least in part on the execution of computer program instructions stored in the first memory 34, in the second memory 44, or in another memory or computer-readable medium that is accessible to the one or more processing circuits 32.

In at least one embodiment, the first memory 34 is on-chip memory, or another type of low-latency memory that is capable of supporting the high-speed routing processing at issue. In an example embodiment, the first memory 34 is internal to the digital processing circuit comprising the one or more processing circuits 32, or the first memory 34 is otherwise accessible to the digital processing circuit at a first latency. Conversely, the second memory 44 is external to the digital processing circuit or otherwise accessible to the digital processing circuit at a second latency that is high in comparison to the first latency. The digital processing circuit is configured to fetch identified packet processing rule 22 or rules 22 from the second memory 44 but advantageously can avoid doing so during processing of a given packet key 18, unless the fingerprint database processing first indicates that there is at least one packet processing rule 22 in the rules database 20 that is a possible match for the packet key 18.

Figure 7:
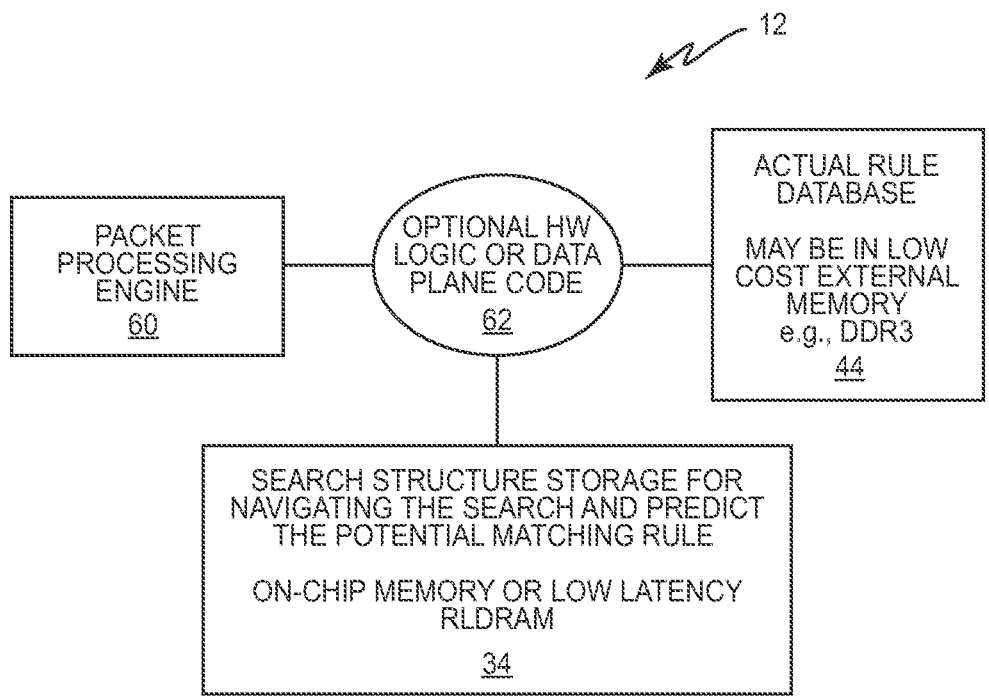
FIG. 7 is another block diagram of functional processing circuits and associated database structures, as implemented in one example of the at least one node introduced in FIG. 1.

FIG. 7 illustrates an example arrangement consistent with the node architecture introduced in FIG. 4. Here, the node 12 includes a packet-processing engine 60 and an optional hardware logic or data plane code 62. The actual rules database 20 is stored in the second memory 44, which may be low-cost external memory such as DDR3 (double data rate type three synchronous dynamic random access memory). Here, it will be understood that the packet-processing engine 60 represents an implementation of the earlier-disclosed one or more processing circuits 32 and that the packet-processing engine 60 may include the first memory 34 as on-chip memory or another type of low-latency memory like RLDRAM (reduced-latency dynamic random access memory). Here, use of the terms "low" and "high" are defined in the relative sense that the first memory 34 must be fast to support fingerprint database processing (searching for possibly matching rules 22), while the second memory 44 can be slower, as the number of transactions with it is much lower because the searching for possible matches is done using the fingerprint database 36 and the rules database 20 need be accessed only for the retrieval of possibly-matching rules 22.

Notably, FIG. 7 indicates that the first memory 34 provides search structure storage, for navigating the search structure 40, for predicting the possibly matching rules 22. In this regard, the packet-processing engine 60, or more generally the earlier-introduced processing circuit(s) 32, is configured to define the search structure 40 as a function of the cut-point bits 52 of the fingerprint database 36 and traverse the search structure 40 as a function of the characteristic bits 50 of the packet key 18, to identify the packet processing rule 22 or rules that are possible matches for the packet key 18.

In one or more embodiments, the one or more processing circuits 32 are configured to identify a single packet processing rule 22 as the only possible match for the packet key 18, or to identify a subset or range of the packet processing rules 22 in the rules database 20 that represent possible matches for the packet key 18. In either case, in an advantageous configuration of packet classification processing, the one or more processing circuits 32 do not access the second memory 44 for classification processing of a given packet key 18 unless the fingerprint database processing indicates that there is at least one possibly matching packet processing rule 22 in the rules database 20.

In at least one embodiment, the fingerprint database 36 is configured to provide exact matching between packet keys 18 and respective individual rules 22 in the rules database 20. Here, the one or more processing circuits 32 are configured to preprocess the rules database 20, for subsequent use in live packet classification processing based on being configured to: logically order the packet processing rules 22 in the rules database 20 in binary order; obtain the bit positions of the most-significant bits (MSBs) produced by application of an exclusive-or ("XOR") operation to pairs of the packet processing rules 22 taken in said binary order, where these bit positions are the cut-point bits 52.

Correspondingly, the one or more packet processing circuits 32 are additionally configured in one or more embodiments to form the search structure 40 in correspondence to a listing of the cut-point bits 52, based on dividing and further subdividing the set of packet processing rules 22 according to the cut-point bits 52 taken in descending or ascending order. In at least one such arrangement, fingerprint database processing allows for the identification of a single, possibly-matching rule 22 from the rules database 20, and the one or more processing circuits 32 are configured to retrieve the singularly-identified rule 22 from the rules database 20, for comparison matching with the packet key 18 of the packet 16 being classified.

In one or more other embodiments, the fingerprint database 36 or, equivalently, a search structure representation of the fingerprint database 36, is configured to provide range matching between packet keys 18 and respective ranges of individual rules 22 in the rules database 20. Such an arrangement is based on the one or more processing circuits 32 being configured to preprocess the rules database 20 to obtain the fingerprint database 36, based on: ordering the packet processing rules 22 into non-overlapping ranges; generating a rule fingerprint 38 corresponding to a lower-end of each non-overlapping range; and forming a search structure 40 corresponding to the rule fingerprints 38. Correspondingly, the one or more processing circuits 32 are configured to fetch the identified packet processing rule 22 or rules 22 from the rules database 20 based on being configured to retrieve multiple rules 22 from a respective one of the non-overlapping ranges, for comparison matching of individual ones of the multiple retrieved rules 22 to the packet key 18.

In one or more other embodiments, the fingerprint database 36 is based on ranges of rules 22 having overlapping prefixes. The one or more processing circuits 32 are configured to preprocess the rules database 20 such that rules 22 are stored in conjunction with index values corresponding to the rule 22 or rules 22 associated with the overlapping prefixes, and to identify the packet processing rule 22 or rules 22 that are possible matches for a given packet key 18. In particular, here, the one or more processing circuits 32 are configured to perform longest prefix matching and to retrieve the identified packet processing rule 22 or rules 22 by making one access to the second memory 44 containing the rules database 20, to retrieve the rule 22 associated with the longest prefix match, along with the index value or values corresponding to the rule 22 or rules 22 associated with the overlapping prefix.

Further, in at least one embodiment wherein the fingerprint database 36 is based on ranges of rules 22 having overlapping prefixes, the one or more processing circuits 32 are configured to store in a search structure 40 representing the fingerprint database 36 those index values corresponding to the rule 22 or rules 22 associated with the overlapping prefixes. In this context, the one or more processing circuits 32 are configured to identify the packet processing rule 22 or rules 22 that are possible matches for a given packet key 18 by performing longest prefix matching with respect to the search structure 40, including, responsive to traversing in the search structure 40 beyond a child node for which there is a possible matching rule, using the index values to backtrack from the child node to a corresponding parent node representing a possibly-matching rule 22.

Further, in at least one embodiment, the one or more processing circuits 32 are configured in one or more embodiments to store in a search structure 40 representing the fingerprint database 36 those index values corresponding to the rule 22 or rules 22 associated with overlapping rule prefixes. The one or more processing circuits 32 identify the packet processing rule 22 or rules 22 that are possible matches for the packet key 18 by performing longest prefix matching with respect to the search structure 40, to identify a range of rules 22 to be fetched from the rules database 20 for comparison matching with respect to the packet key 18.

Figure 8:
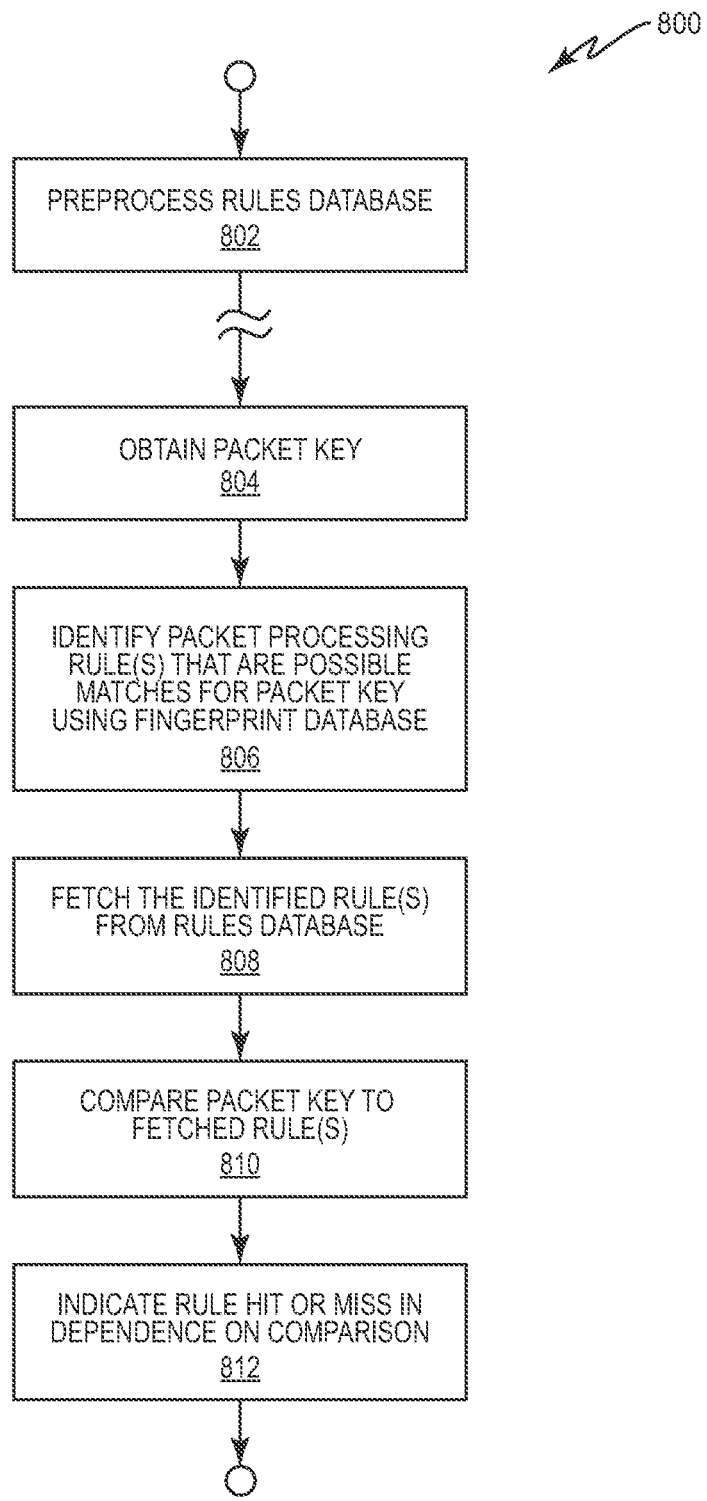
FIG. 8 is a logic flow diagram of one embodiment of a method of packet classification processing, based on use of a fingerprint database of rule fingerprints corresponding to a rules database of packet processing rules.

With the above packet classification processing configurations in mind, FIG. 8 illustrates one embodiment of a method 800 of packet classification processing implemented at the node 12. It will be understood that the "live" handling of a given inbound packet 16, including processing of its packet key 18 for classification processing, does not include the processing introduced in Block 802, and rather includes Blocks 804-812 (even). The "preprocessing" operations in Block 802 are to be understood as being performed on an as-needed basis, e.g., in response to the addition of a new rules database 20 and/or in response to the modification of an existing rules database 20.

Preprocessing operations include the generation of the rule fingerprints 38 comprising the fingerprint database 36, based on processing the packet processing rules 22 of the rules database 20 in accordance with earlier-described teachings (i.e., cut-point bit determination, etc.). Further, preprocessing in one or more embodiments includes storing the rules 22 in ordered fashion, reflecting the organization of the fingerprint database 36 and/or storing index values reflecting the earlier-described overlapping ranges of rules 22.

In any case, the patent classification method 800 with respect to any given packet key 18 during live routing/switching operations comprises obtaining (Block 804) the packet key 18 corresponding to a data packet 16 received by the node 12—an inbound packet. The method 800 further includes identifying (Block 806) a packet processing rule 22 or rules that are possible matches for the packet key 18 by comparing characteristic bits 50 of the packet key 18 to rule fingerprints 38 in the fingerprint database 36. As noted, the fingerprint database 36 is obtained during preprocessing (Block 802) and it serves as a compressed representation of the rules database 20. In particular, the rule fingerprints 38 comprise cut-point bits 52 corresponding to bit positions in the packet processing rules 22 that operate as search cut-points distinguishing between the rules or subsets of them, where the characteristic bits 50 of the packet key 18 occupy bit positions corresponding to the cut-point bits 52.

The method 800 continues with fetching (Block 808) the identified packet processing rule 22 or rules 22 from the rules database 20 and then comparing (Block 810) the packet key 18 with the fetched rule 22 or rules 22. The method 800 correspondingly includes indicating (Block 812) a rule hit or miss in dependence on whether the packet key 18 matches any of the fetched rule 22 or rules 22.

It will thus be appreciated that the preprocessing is used to determine the cut-point bits 52 that will serve as the rule fingerprints 38 comprising the fingerprint database 36, and that the cut-point bits 52 will need much less space than original rules database 20. This arrangement allows the actual packet processing rules 22 to reside in low-cost external memory. Of course, this allowance does not mean that it is mandatory that rules database 20 be stored external to the packet-processing engine 60, or that the present invention does not apply in such cases. Indeed, it may be that some designs allow for fingerprint database 36 and the rules database 20 both to be on-chip, and even in the same memory.

Even in such cases, the efficiencies gained by fingerprint database processing to determine whether there are any possibly-matching rules 22 for a given packet key 18 are significant, because such processing only requires processing involving the much smaller fingerprint bit strings (as compared to the alternative of processing the full-length packet processing rules 22). An example case is multi-core "high touch" packet processing. In general, use of the fingerprint database 36 provides for cache-friendly lookup processing and can be understood even more broadly as optimizing the lookup process for better performance.

However, as recognized herein, it is advantageous to store at least the fingerprint database 36 in on-chip memory or other low-latency memory. The fingerprint database 36 may be arranged or otherwise represented in a search structure 40, which may be a Binary Tree, an N-Way Tree, a Direct Indexing structure, etc. This use of the fingerprint database 36 for initial possible-match searching transforms the vexing problem of performing high-speed searches on potentially large rules databases 20, with their potentially long word-length rules 22, into a manageable, high-performance structured search of the much smaller fingerprint database 36 to predict whether any of the actual rules 22 are possible matches for any given packet key 18.

Once the possibly-matching rule or rules 22 are identified from the fingerprint database processing, the identified rule or rules 22 are brought in from actual rule storage and such is the only time the packet-processing engine 60 needs to access external or high latency memory like DDR3 for live packet classification. If any of the fetched rule or rules 22 matches with the packet key 18, then the packet-processing engine 60 declares a rule hit, otherwise it declares a miss.

Among the many advantages of this arrangement are these items: a compressed search structure 40 is generated and searched initially before there is any need to access the actual rules database 20; the lookup cost is independent of the width (bit-wise) of the rules 22 in the rules database 20; the fingerprint database 36 in the form of the compressed search structure 40 has a much smaller memory footprint than that of the rules database 20 and fits into on-chip or other (relatively) scarce low-latency memory much more readily than the entire rules database 20; and, in one or more embodiments, the fingerprint-based approach to packet classification requires only one access to external or high-latency memory (for fetching a rule 22 identified as a possible match for the given packet key 18).

For example, it is expected that a key width of 384 bits is enough to cover an IPv6 ACL, and with the teachings herein, 64K rules can be accommodated in less than 3 Mbits of on-chip memory for the corresponding fingerprint database 36. That amount of memory in a 28 nm silicon process is less than 2 square millimeters of die area, even assuming an implementation overhead of twenty percent. The search structure 40 representing the fingerprint database 36 can be efficiently searched using binary search algorithms, tree search algorithms, and/or direct-indexing algorithms. In at least one embodiment, searching is based on an optimized LPM lookup that is detailed later herein. Broadly, the fingerprint-based approach taught herein has the advantage of being directly applicable to exact-match searching, range-match searching, LPM-based lookup, etc.

Here, it should be noted that the fingerprint processing does not result in false negatives. That is, if fingerprint processing indicates that none of the rules 22 are possible matches for the packet key 18, then a miss can be declared without error. On the other hand, if the fingerprint processing indicates that one or more of the rules 22 are possible matches for the packet key 18, it may turn out that none of the fetched rules 22 were an actual match for the packet key 18. Thus, fingerprint processing can generate a false positive, but such a possibility does not reduce the efficiencies gained by using fingerprint processing to determine whether any rule or rules 22 should be fetched from the rules database 20 for comparison to the packet key 18.

In one approach, the rules 22 comprise ACEs in an ACL serving as the rules database 20. Preprocessing in one or more embodiments includes:

Decompose the ACL rules in different fields (some fields can be combined);
    some fields for LPM matching
    some fields for exact matching
    some fields for range matching
The processing engine 60 creates the cross product to find a final resolution, much like what is done in MRFC.

In an example relevant to MRFC in an ERICSSON SMART EDGE router, such preprocessing may comprise:
Take all fields of an ACL together and determine their cross product;
Attempt to carry out the lookup operation.

In an exact match lookup example, let "R1" denote a first packet processing rule 22-1, "R2" denote rule 22-2, and so on. Further, for an example set of Rules R1 through R8, assume that the rule bit patterns are as follows (with the LSBs being right-most):

| R1- | 00000000 | 00000000 | 00000000 | 00000000 |
| --- | --- | --- | --- | --- |
| R2- | 00100000 | 00101000 | 00000000 | 00000000 |
| R3- | 00101000 | 00101100 | 00000000 | 00000000 |
| R4- | 01001000 | 00101101 | 11001100 | 01010100 |
| R5- | 01100000 | 00101110 | 11001100 | 00110010 |
| R6- | 01110000 | 00110110 | 00011001 | 00110011 |
| R7- | 10000000 | 11000000 | 00011010 | 00000000 |
| R8- | 10010000 | 11110000 | 00000000 | 00000000 |

The rules R1-R8 are sorted in ascending order. The sorting need not be physical, e.g., the sorting can be done logically without necessarily reordering the rules in actual storage.

The logical XOR is then taken of each pairing of the rules 22 taken in their consecutive order. This operation identifies the bit position for the most significant differentiating bit between the two rules and the XOR processing includes recording the identified bit position as a cut-point bit 52. See the following examples for R1-R8:

XOR_BIT1=bit position of most significant bit set in (R1 XOR R2)=29
XOR_BIT2=bit position of most significant bit set in (R2 XOR R3)=27
XOR_BIT3=bit position of most significant bit set in (R3 XOR R4)=30
XOR_BIT4=bit position of most significant bit set in (R4 XOR R5)=29
XOR_BIT5=bit position of most significant bit set in (R5 XOR R6)=28
XOR_BIT6=bit position of most significant bit set in (R6 XOR R7)=31
XOR_BIT7=bit position of most significant bit set in (R7 XOR R8)=28

The above processing yields an XOR bit list representing the fingerprints 38 of the example set of rules 22 shown as R1-R8 above. The XOR bit list in this example is
XOR_BIT_LIST={29, 27, 30, 29, 28, 31, 28},
and it serves as the fingerprint database 36. Thus, in this example the actual rules R1-R8 can be understood as the set of actual packet processing rules 22 comprising the rules database 20, and the XOR list of cut-point bits 52 can be understood as the rule fingerprints 38 comprising the fingerprint database 36.

Advantageously, the rule fingerprints 38 comprising the members of the above XOR bit list can be encoded using only five bits. That is, 5-bit rule fingerprints 38 are used to represent 32-bit rules 22. Even if the rules 22 were, e.g., IPv6 address masks, the fingerprints 38 would be encoded as 7-bit values. The XOR-based cut-point bit approach to fingerprint derivation thus yields a dramatic compression of the fingerprint database 36 as compared to the rules database 20.

In an example method of constructing the search structure equivalent for representation of the fingerprint database 36 represented by the XOR_BIT_LIST={xor_bit1=29, xor_bit2=27, xor_bit3=30, xor_bit4=29, xor_bit5=28, xor_bit6=31, xor_bit7=28}, processing begins with:

finding the largest number in the XOR list and use that number as a first cut point—here, the largest number=31 and it serves as the first cut point in a search tree structure;
use of the above first cut point yields a left side of the tree having the following entries below the cut-point node of 31: {29, 27, 30, 29, 28};
correspondingly, the right side of the tree has entries: {28}

Figure 9:
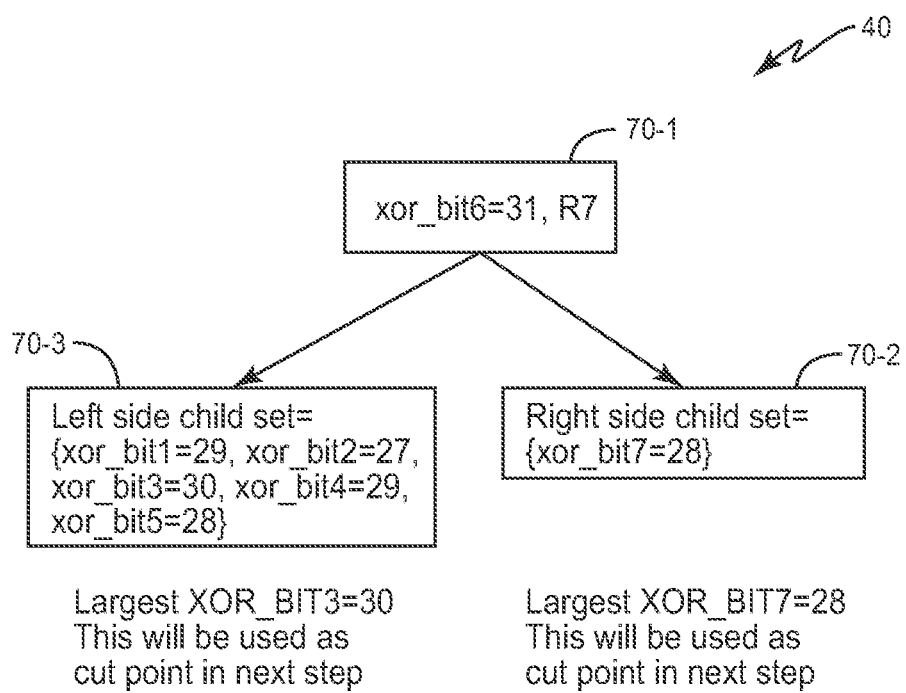
FIG. 9 is a partial block diagram of one embodiment of a search structure 40 representing a fingerprint database of rule fingerprints, such as is traversed in one or more embodiments of fingerprint database processing to identify possibly matching packet processing rules for a given packet key.

The corresponding example search structure 40 is shown in FIG. 9, wherein one sees, for example, a node 70-1 corresponding to xor_bit6=31. Now, in dependence on the 1 or 0 binary value of that cut-point bit 52, the search will go down and rightward in the illustrated tree structure for the right-side child set of nodes 70 corresponding to xor_bit7=28, or down and leftward for left-side childe set of nodes 70 corresponding to xor_bit1=29, xor_bit2=27, xor_bit3=30, xor_bit4=29, and xor_bit5=28.

Figure 10:
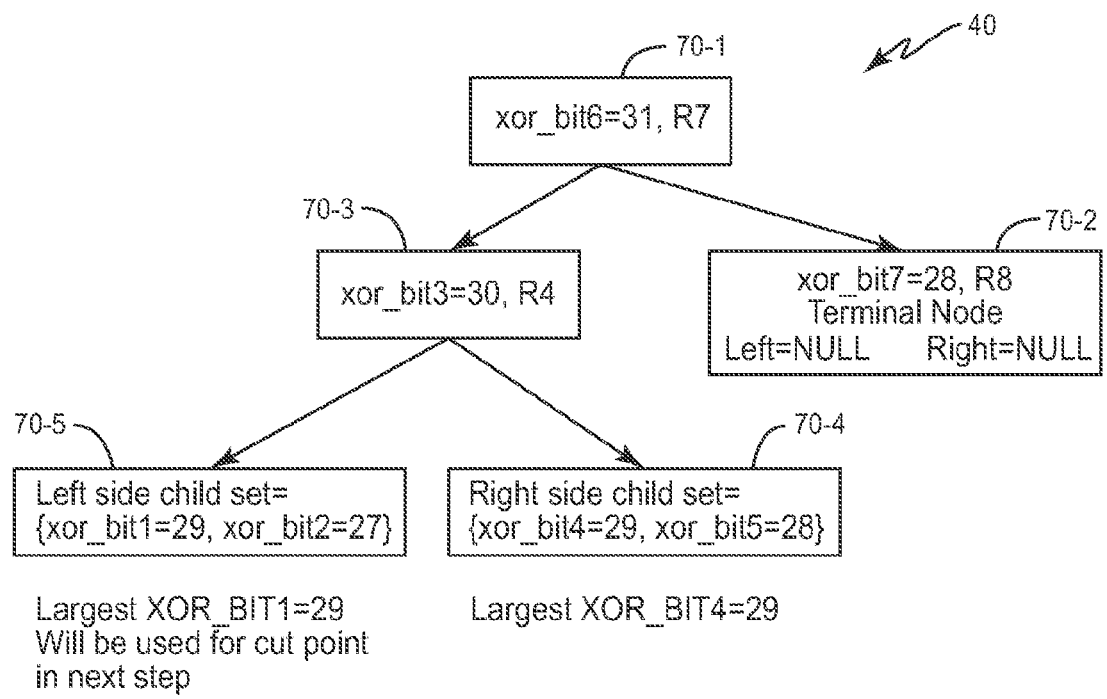
FIGS. 10 and 11 are block diagrams providing further details for the example search structure of FIG. 9.
Figure 11:
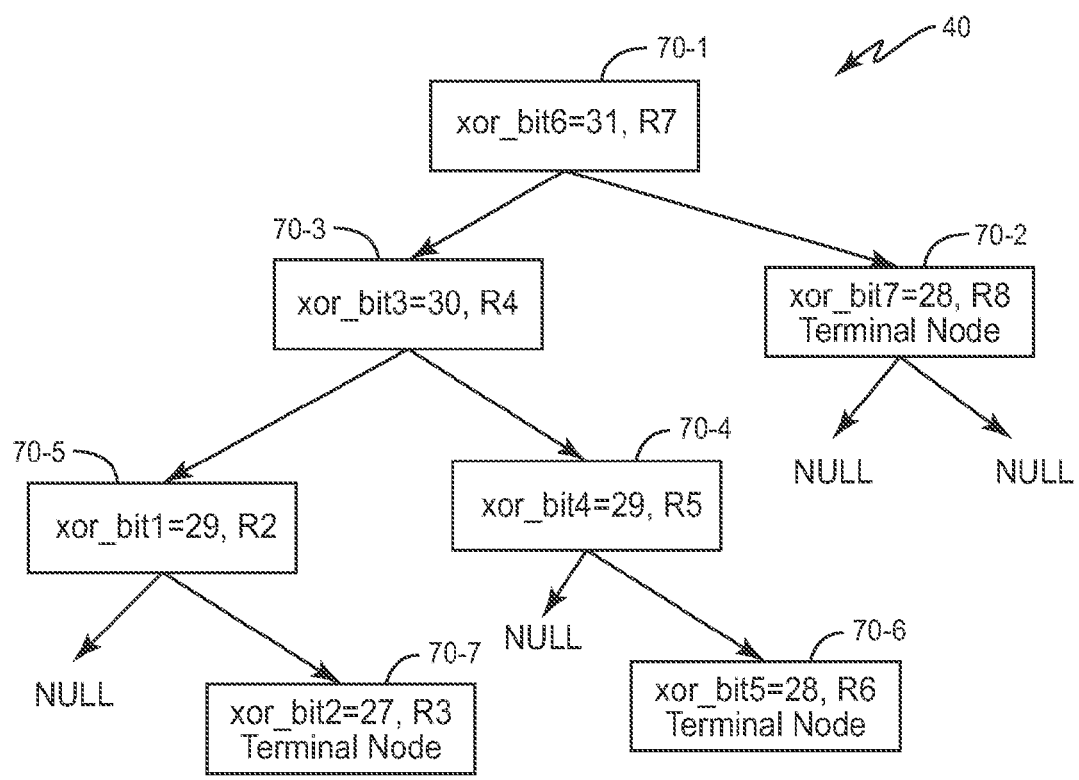

To select the cut-points for the child nodes 70 in the search structure 40, select the largest XOR bits on left and right of each node 70 and use that as the cut point. FIG. 10 illustrates further progression of the search structure 40 according to this approach. FIG. 11 illustrates the final search structure 40 obtained through the addition of the further child nodes 70.

The resultant search structure 40 serves as the compressed version of the fingerprint database 36 for ready storage in the first memory 34. Possibly matching rules 22 are identified by the packet-processing engine 60, based on traversing from parent to child nodes 70 in the search structure 40 as a function of the binary values of the characteristic bits 50 of the packet key 18 being evaluated. In an example of such fingerprint database processing, assume that the packet-processing engine 60 is presented with a packet key 18 as follows:
PACKET KEY=01001000 00101101 11001100 01010100.

As per the XOR list—{29, 27, 30, 29, 28, 31, 28}, the packet-processing engine 60 extracts the following bits from the packet key 18: BIT_29=0, BIT_27=1, BIT_30=1, BIT_29=0, BIT_28=0, BIT_31=0, BIT_28=0. The packet-processing engine 60 starts with the root node 70-1 in the search structure 40 shown in FIG. 11. Processing from the root node 70 will go down and right if bit 31 of the packet key 18 is 1 and will go down and left if bit 31 of the packet key 18 is a 0. Thus, bit 31 of the packet key 18 is the first characteristic bit 50 of the packet key 18 to be used in traversing the search structure 40.

In the example, bit 31 of the packet key 18 is 0, so the packet-processing engine 40 traverses down and left in the search structure 40, to the child node 70-3, which indicates that bit 30 of the packet key 18 should be examined. Hence, bit 30 of the packet key 18 represents the next one of its characteristic bits 50 to be used in traversing the search structure 40. Because bit 30 of the packet key 18 is a 1, the packet-processing engine 60 traverses downward to the right, thus arriving at child node 70-4, which corresponds to XOR_BIT4.

At this point, it should be noted that the packet-processing engine 60 remembers every node 70 visited during traversal of the search structure 40, to provide for reversion to the upper node(s) 70 in support of lookup processing.

Continuing with the example, and node 70-4, the packet-processing engine 60 evaluates bit 29 of the packet processing key 18 as the next characteristic bit 50 to be examined. Because bit 29 is 0, and also node 70-4 has no left child, node 70-4 is a terminal node for the purpose of continuing to the left. The algorithm requires that when the search reaches a terminating node, the corresponding bit (specified on the node 70 in the search structure 40) of the target rule must be 1; otherwise backtracking on the search structure is required. The backtracking can potentially go back multiple levels in the search structure until the said requirement is satisfied. Now the search backtracks to node 70-3. After examining the 30th bit of the target rule (it is 1), the fingerprint processing algorithm predicts node 70-3 (Rule R4) to be the only possible match.

The packet-processing engine 60 thus fetches R4 from the second memory 44 and compares it with the packet key 18, declaring a rule hit based on that comparison.

Now, consider an example solution to the "range matching" problem, wherein the fingerprint database processing for a given packet key 18 is used to identify a subset of the packet processing rules 22 in the rules database 20 that includes one or more possibly matching rules 22. Consider IPv4 addresses as an example. An address such as 192.168.1.0/32 requires an exact match. Change the prefix length to a smaller value, say 28, then 192.168.1.0/28 represents a range from 192.168.1.0/32 to 192.168.1.255/32. Consider a few addresses or address ranges (they might not be used in real world like this): 0.0.0.80/32, [0.0.0.80-0.0.0.84], [0.0.0.82-0.0.0.86], [0.0.0.1-0.0.3.255], [0.0.0.1-0.0.255.255]. To simplify the notations here, convert the addresses of four octets by concatenation into a single number. For example, 0.0.255.255 is 0x00.00.FF.FF, and 0x0000FFFF is decimal 65535. These example ranges can be written as pairs of numbers [80,80], [80,84], [82,90], [1,1023], [1-65535], and the packet-processing engine 60 in one or more embodiments is configured to insure that the ranges do not have any partial overlap. For example, in the range set shown immediately above, there is a partial overlap between ranges [80,84] and [82,90], but neither is fully contained in the other.

In this example case, the packet-processing engine 60 is configured to eliminate the partial overlaps in the rule ranges by creating an equivalent set of ranges without overlapping ranges. Such processing creates logical ranges of the rules 22 in the rules database 20 for this example case as [1,79], [80, 80], [81,81], [82,84], [85,90], [91,1023], [1024, 65535]. These are non-overlapping ranges. Among them, some ranges are contained by multiples of the original ranges before such processing. For example, [1,79] is contained by the original [1,1023], and [1,65535]. Such information is stored alongside these processed ranges, such that when a match is predicted to be [1,79], the original [1,1023] and [1,65535] can be retrieved. In instances where sorting is needed, the packet-processing engine 60 is configured to sort these non-overlapping ranges on the basis of the lower end of each range. The immediately foregoing ranges are already sorted in this order.

The corresponding arrangement for the rules database 20 as held in the second memory 44 is, for example:

R1—1, 79
R2—80, 80
R3—81, 81
R4—82, 84
R5—85, 90
R6—91, 1023
R7—1024, 65535

As part of this preprocessing, the packet-processing engine 60 creates the corresponding rule fingerprints 38 based on the following associations R0—0 (a dummy rule of zeros inserted here to include R1 in the fingerprint processing)
R1—1
R2—80
R3—81
R4—82
R5—85
R6—91
R7—1024

After generating the rule fingerprints 38, the packet-processing engine 60 forms the corresponding search structure 40, e.g., as shown in the examples of FIGS. 9-11. With the search structure 40 based on non-overlapping ranges, the packet-processing engine 60 predicts the range in which a possibly matching rule 22 lies, and the corresponding rules 22 for that range are fetched by the packet-processing engine 60 for comparison to an example packet key 18.

One or more other embodiments are based on LPM lookup. In an example case, the prefixes are extended using 0. One need only consider the case where one prefix is covered (shorter prefix length) by another prefix. Note that the shorter prefix will have a smaller numeric value than the longer prefix and this attribute can be exploited—i.e., if the packet-processing engine 60 predicts the longer prefix as a possibly matching rule 22, it can fetch all of the rules 22 covered by the longer prefix, such that all such rules 22 are available for comparison matching against the packet key 18 being evaluated.

In an example case of IPv4 addresses:
R1—Pa.0.0.0/8
R2—Pb.Pc.0.0/8
R3—P1.0.0.0/8
R4—P1.P2.0.0/16
R5—P1.P2.A.B/32
R6—P1.X.Y.Z/32 where Pa, Pb, Pc, P1, P2, A, B, X, Y, Z are non-zero octets of an IP address, and mutually different. In addition, it is assumed that the rules are sorted in order as they are now. For their values, for instance, there can be P1=192, P2=168, A=106, B=1, then R5 becomes 192.168.106.1. In this example, the second memory 44 will have the following format for the rules database 20:

Pa.0.0.0, pl=8, {val}, {opl=0,op=Null, {val=Null}}
Pb.Pc.0.0, pl=16, {val}, {opl=0,op=Null, {val=Null}}
P1.0.0.0, pl=8, {val}, {opl=0,op=Null, {val=Null}}
P1.P2.0.0, pl=16, {val}, {opl=8,op=R3, {val=Null}}
P1.P2.A.B, pl=32, {val}, {opl=16, op=R4, {val}}, {opl=8, op=R3, {val}}
P1.P2.X.Y, pl=32, {val} {opl=16, op=R4, {val}}, {opl=8, op=R3, {val}} where "pl" is prefix length, "opl" is overlapping prefix length, "op" is overlapping prefix, {val} is the action or policy "value" associated with this rule, for example DENY or ALLOW in the ACL scenario. Besides the original rule of four octets and its prefix length, a list of its overlapping rules is also stored, in the order of the prefix length from long to short. This list can be implemented, for example, as a linked-list. The packet-processing engine 60 generates the rule fingerprints 38 as before and constructs the search structure 40 as a node/branch search tree as before. The "lookup" processing of the fingerprint database 36 to find possibly matching rules 22 are basically as explained in the context of FIGS. 9-11, but there is a special case to consider.

Suppose the packet-processing engine 60 is looking up an IPv4 address P1.P2.X.Z, where Z is an octet different than Y, and where, for P1.P2.M.N, "P1.P2" refers to a common prefix to IP addresses, e.g. 10.1.5.7, 10.1.26.39, 10.1.50.100, etc. In this example case, 10.1.0.0/16 is common prefix and that common prefix can be indicated by P1.P2.0.0 in P1.P2.M.N. In any case, a traversal of the search structure 40 using the same packet key 18 as given in the example of FIGS. 9-11 will identify, say R6 as the possible matching rule 22 (it depends on what are the values of Y and Z; here it is assumed Y and Z take such values that R6 is identified). However, when the packet-processing engine 60 brings R6 in from the second memory 44, it fails to match it with the packet key 18. The overlapping prefix information has already been stored in the rules database 20 in conjunction with R6, which are R4 and R3. The packet-processing engine 60 uses the prefix length 16 to obtain R4 (replacing the prefix length 32 of P1.P2.X.Y/32 with 16, there is P1.P2.X.Y/16, which is effectively R4, P1.P2.0.0/16), and finds a match in R4. This example demonstrates with keeping the information of those overlapping rules alongside in the rules database, the need of backtracking in the search structure 40 due to rules being overlapped with each other, is eliminated, without requiring subsequent, additional accesses to the second memory 44.

Another LPM lookup embodiment embeds some part of the prefix information on the tree nodes/edges of the search structure 40 that represents the fingerprint database 36—e.g., prefix information is embedded in the search structure 40 in correspondence with the relevant nodes 70 in the search tree example of FIGS. 9-11. Such embodiments do not need backtracking in the search structure 40 and, as such, fingerprint processing according to such embodiments mitigates the various complications caused by backtracking for cases involving more "generalized" rules 22, or, in other words, rules with shorter prefix lengths. Note that this embodiment describes another approach to eliminate backtracking in the search structure than that has been discussed in immediately preceding discussion of the one or more embodiments based on LPM lookup—see, e.g., the foregoing IPv4 example—, and shall not be considered as an extension or direct continuation to that embodiment. During traversal, the "parent-child" relationship of nodes 70 in the search structure 40 is not ambiguous. It is perceived that since only the "important" fingerprint bits are represented in the search structure 40, the search potentially goes "too far" to reach a longer prefix rule 22 that matches in terms of fingerprinting but is not a complete match for the packet key 18 in question.

Figure 12:
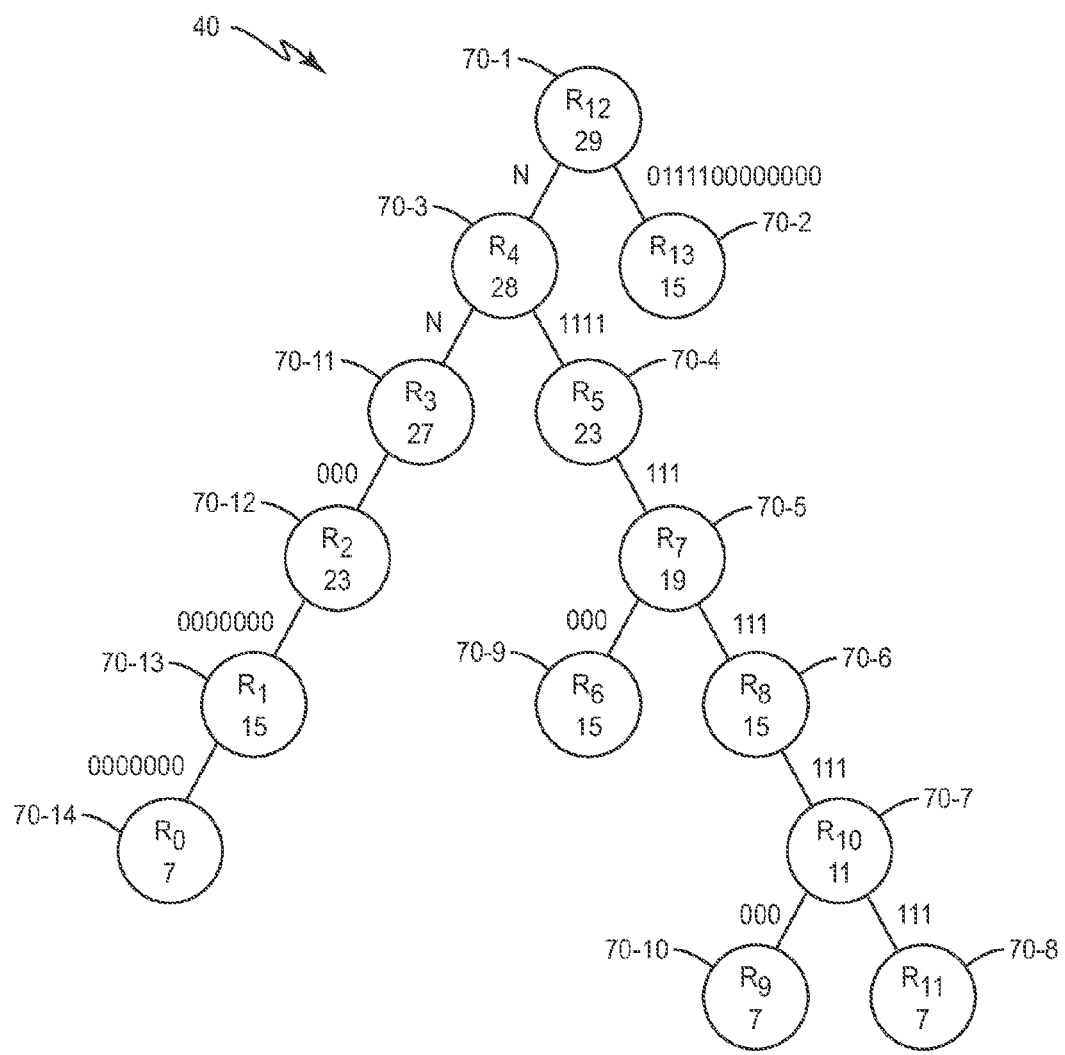
FIGS. 12-16 are further example embodiments of search structures representing or otherwise embodying a fingerprint database of rule fingerprints.

In an example of such an embodiment, the packet-processing engine 60 stores part of the prefix information on the nodes 70 in the search structure 40, or equivalently the prefix information on the "edges" of the nodes 70. For a partial prefix case, FIG. 12 provides an example of the corresponding search structure 40 for a set of fourteen packet processing rules 22, denoted as R0-R13. The original rules R0-R13 are listed as follows,

| Rules (0x) | Rule Bit Pattern | Bit position |
| --- | --- | --- |
| Dummy | 00.00.00.00 | |
| R0 | 00.00.00.FF/32 | 7 |
| R1 | 00.00.FF.00/24 | 15 |
| R2 | 00.FF.00.FF/16 | 23 |
| R3 | 0F.00.00.00/8 | 26 |
| R4 | 1F.00.00.00/8 | 28 |
| R5 | 1F.F0.00.00/12 | 23 |
| R6 | 1F.F0.FF.00/24 | 15 |
| R7 | 1F.FF.00.00/16 | 19 |
| R8 | 1F.FF.F0.00/20 | 15 |
| R9 | 1F.FF.F0.FF/32 | 7 |
| R10 | 1F.FF.FF.00/24 | 11 |
| R11 | 1F.FF.FF.FF/32 | 7 |
| R12 | 2F.00.00.00/32 | 29 |
| R13 | 2F.00.FF.00/32 | 15 |

Each node 70 is labeled according to its corresponding rule 22 and the associated cut-point bit position. For example, the node 70-1 corresponds to rule R12, which is associated with XOR bit position 29. Node 70-2 corresponds to R13 with the bit position 15. Node 70-13 for R1 also embeds bit position 15 because the XOR operation between R1 and R0 results in 0x00.00.FF.FF having its MSB at position 15. It is the same case with node 70-6.

As for scalability of these approaches to larger sets of packet processing rules 22, consider an example rules database containing one thousand (1K) packet filtering rules labeled as

R1
R2
...
...
R128
R256
...
...
...
R768
...
...
R1024.

This example rules database 20 of one thousand packet processing rules 22 has the potential for producing a search structure 40 with a large number of levels, e.g., ten or more levels of "depth." As an alternative, the packet-processing engine 60 is configured in one or more embodiments to use a "nested" search lookup. Take, for example, the following four rules 22 from the set of one thousand rules 22: R1, R256, R768, and R1024. The packet-processing engine 60 follows the same range prediction processing as described in the above range-matching examples, which can be done without requiring access to the actual rules database 20 in the second memory 44.

Such processing yields the root node of the search structure 40 which will indicate the actual, possibly-matching rule 22. The top-level lookup may or may not be arranged as a tree search, which facilitates scaling of the lookup process for potentially very large sets of packet processing rules 22. For example, a hierarchical lookup is used, to limit the depth of the tree for an ACL containing a high number of rules, e.g., 4 k rules arranged in ascending order. Processing could first "pick up" rule 1, rule 1024, rule 2048, rule 3072 and rule 4096. If the rule being searched for falls between rule 1 and rule 1024, then the search tree need only be used with respect to that range only. Further, fast concurrent search methods at this level also may be used.

The packet-processing engine 60 can also be configured to handle the "degenerate" case in an advantageous manner. Consider that the search structure 40 can be skewed to the point that traversal amounts to "linear walking" In the degenerate case where the search structure 40 is skewed by one long branch of successive nodes 70, that section of the search structure 40 can be compressed via use of direct lookup techniques.

Another one or more embodiments may be regarded as "composite ACL lookup" techniques. In this type of ACL lookup, the packet-processing engine 60 does not need the cross product of a multi-dimensional lookup. Instead, searching is based on an arrangement of the ACL comprising the rules database 20 in ascending order. For the case of overlapping prefixes, the packet-processing engine 60 can use the previously detailed technique for eliminating overlapping prefixes in the context of LPM lookup. As a minor difference here with composite ACL lookup, however, there will be a different rule index, based on where rule matching fails for the packet key 18. In the overlapping case, the rule index is obtained and either information in the search node or the stored information in the rule memory aids navigation to the correct rule.

In terms of contemplated optimizations for the rules database 20 as stored in the second memory 44, the second memory 44 comprises, for example, interleaved DDR3 banks for optimization of access relative to RAS and CAS delays, bank closure, and pre-charge issues. Requests to the DDR3 can be reordered to increase utilization. Because the fingerprint database 36 simply comprises bit patterns in some sense and can be easily "profiled," and because dummy rules can be inserted to insure that the search structure 40 matches one of the existing profiles to save storage in the first memory 34. Further, the search structure 40 can be optimized according to N-way tree searching techniques, combination trees, and direct indexing.

Use of the fingerprint database processing removes the need for TCAM, which saves significant cost and can result in significant power savings. That is, given the nature of the search structure 40 representing the fingerprint database 36, TCAM is not needed to provide high-speed lookup of the rule 22 or rules 22 that are possible matches for a given packet key 18. Instead, the search structure 40 is quickly traversed by the packet-processing engine 60 as a function of the values of the characteristic bits 50 in the packet key 18, to identify the rule 22 or rules 22 that are possible matches for the packet key 18. These possibly matching rules 22 (fetched singularly or fetched range-wise) are retrieved at one time from the second memory 44 for exact matching to the packet key 18.

In an example case, which suggests some of the flexibility provided by the present invention with respect to different types of rule sets comprising the rules database(s) 20 at issue herein, consider 0.0.0.0/8, 0.0.0.0/16, 0.0.0.0/24, which are all-zero rules in the single-dimensional (1-D) ACL. In this case, there cannot be a dummy rule 22 for use in the XOR processing described as part of the rules database preprocessing. (The dummy rule 22 here is the all-zero rule.) These need to be considered separately. As one possible solution, e.g., it is easy to combine all such rules with bit masks.

For the above 1-D example, the combination becomes 0.0.0.0/(8+16+24). (More technically, the combination can be represented as $(1<<(8-1))+(1<<(16-1)+(1<<(24-1))$.) With this approach, the packet-processing engine 60 can use a 32-bit integer as bit mask for single dimension IPv4 rules.

There are other special cases that can prevent direct application of the XOR operations used in preprocessing of the rules database 20, for generation of the cut-point bits 52. For example, different rules 22 in the rules database 20 may have the same value but have different length prefixes. For example, consider two rules 22 given as 1.0.0.0/16 and 1.0.0.0/24. This is a 1-D case and the XOR will be all zeros. Once again, the packet-processing engine 60 can use a bit mask to combine the two rules into one as 1.0.0.0/(16+24).

Now consider another problem, where there are more than two rules 22 and not every preceding rule 22 (when the rules 22 are logically ordered) "contains" the ones that follow it. For example, consider the following set of rules 22: 1.0.0.0/8, 1.0.0.0/16, 1.0.0.0/24, 1.0.1.0/24, and 1.1.0.0/16. In one or more embodiments, the packet-processing engine 60 is configured to handle such situations by combining the rules 22 having the same values to obtain 1.0.0.0/(8+16+24), 1.0.1.0/24, and 1.1.0.0/16.

In this context, when the packet-processing engine 60 performs matching, if 1.0.1.0/24 or 1.1.0.0/16 is a false positive match, it further examines 1.0.0.0/(8+16+24) and checks only the prefix lengths smaller than the value(s) than the target key. For example, for 1.0.1.0/24, the packet-processing engine 60 checks prefix lengths 8 and 16 of 1.0.0.0/(8+16+24). As for 1.1.0.0/16, the packet-processing engine 60 checks prefix length 8.

In terms of finding the rule 22 that is an actual match for the packet key 18 being evaluated, note that the identification of possibly matching rules 22 by the packet-processing engine 60 produces an index or address such that the possibly matching rule 22 can be fetched from the second memory 44. If that fetched rule 22 in fact does not match the packet key 18, the packet-processing engine 60 examines through the bitmask and finds the more general rule(s) 22.

The inventive method taught herein can be extended for the use in the two dimensional or 2-D cases. As mentioned previously, the value field {val} (ACTION, NEXT_HOP, etc.) is stored alongside the prefix length for 1-D cases. In the 1-D case, only one field of the packet key 18 is considered during lookup; in contrast, for 2-D case, two fields of the packet key 18 are considered during lookup, e.g., for the 1-D case, only IP SRC (source) ADDRESS is considered and for the 2-D case, both the IP SRC address and the IP DST (destination) address are considered.

Directly extending 1-D into the 2-D case using cross products of the two dimensions, will not result in any issue when the DST IP segment is different for the same SRC IP value (different prefix length). If the DST IP segment is the same value with different prefix lengths, the packet-processing engine 60 can combine the overlapping rules using bitmasks respectively for SRC and DST fields. A bitmask can be used to determine valid combinations for SRC and DST prefix lengths.

In considering LPM lookup, preprocessing of the set of rules 22 comprising the rules database 20 in the second memory 44 is needed before the rules 22 are used to generate the corresponding fingerprints 38 for the fingerprint database 36. Consider the following approach:

| Rules (0x) | Rule Bit Pattern | Bit position |
|---|---|---|
| Dummy | 00.00.00.00 | |
| R0 | 00.00.00.FF/32 | 7 |
| R1 | 00.00.FF.00/24 | 15 |
| R2 | 00.FF.00.FF/16 | 23 |
| R3 | 0F.00.00.00/8 | 26 |
| R4 | 1F.00.00.00/8 | 28 |
| R5 | 1F.F0.00.00/12 | 23 |
| R6 | 1F.F0.FF.00/24 | 15 |
| R7 | 1F.FF.00.00/16 | 19 |
| R8 | 1F.FF.F0.00/20 | 15 |
| R9 | 1F.FF.F0.FF/32 | 7 |
| R10 | 1F.FF.FF.00/24 | 11 |
| R11 | 1F.FF.FF.FF/32 | 7 |
| R12 | 2F.00.00.00/32 | 29 |
| R13 | 2F.00.FF.00/32 | 15 |

The packet-processing engine 60 sorts the rules 22 based on the most significant "1" position and thus obtains:

| rank | index | most significant "1" position |
|---|---|---|
| # 0 | R12 | 29 |
| # 1 | R 4 | 28 |
| # 2 | R 3 | 27 |
| # 3 | R 2 | 23 |
| # 4 | R 5 | 23 |
| # 5 | R 7 | 19 |
| # 6 | R 1 | 15 |
| # 7 | R 6 | 15 |
| # 8 | R 8 | 15 |
| # 9 | R13 | 15 |
| # 10 | R10 | 11 |
| # 11 | R 0 | 7 |
| # 12 | R 9 | 7 |
| # 13 | R11 | 7 |

Figure 13:
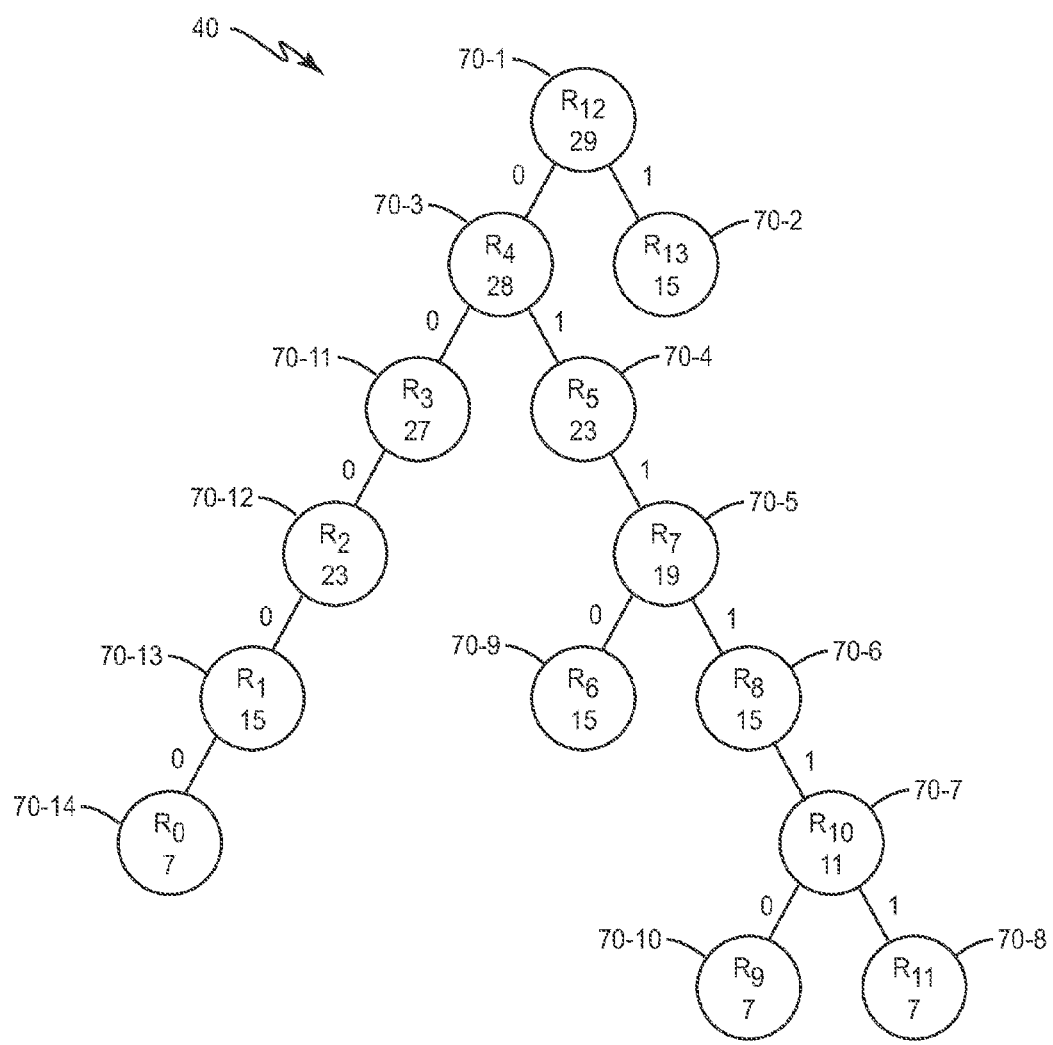

The resulting search structure 40 is shown in FIG. 13.

For the 2-D case, the packet-processing engine 60 concatenates the SRC and DST values but keeps individual prefix lengths. Let a, b, A, B, C, D, etc., represent the SRC or DST segments of a rule 22. Rule segment "a" has a shorter prefix length than "A," and so is the case with "c" and "C." Because the preprocessing has "purged out" the rules 22 of the same value, the following relationship holds: a<A, c<C. Also, A<B, C<D, (B<C is not assumed), with no overlapping in the pairs.

Overlapping prefixes are stored within each segment group, respectively. For example, for a certain rule "A B," "a" is stored as the overlapping prefix "A" for the SRC segment, while "b" is stored together with "B" in the DST segment. As discussed previously, when a possible match is found in "A B," the processing engine 60 fetches the actual rule of "A B" from the database 20, along with the overlapping prefix "a" of "A" and "b" of "B." In case of a miss after comparison, "a B," "A b" or "a b" can potentially be a match (under the premise that those actually exist in the original rule set). Compared with "A B," a rule "a B" has a SRC segment with shorter prefix length, and for matching purposes, a shorter prefix length means "more general." To simplify the statements, such examining a shorter prefix (if applicable) on a SRC/DST segment after the first comparison results in a miss, is called "generalizing" on the SRC/DST segment hereafter.

Consider the case of no overlapping for SRC and DST:
Rule: A B
Rule: C D
Also consider either the same SRC or DST:
Rule: A B
Rule: A D
or
Rule: A B
Rule: C B
In this latter case, no generalizing occurs because the rules 22 do not overlap each other. Thus, no false results are produced when comparing the packet key 18 with the actual rule(s) 22 fetched from the external memory.

Now consider a case with overlapping SRC only. In a first such case there is:
Rule: a B
Rule: A D
or in a second case
Rule: a D
Rule: A B
or in a third case
Rule: a B
Rule: A B For the first case, an SRC/DST segment "? B" matches "a B." where "?" represents any segment matching the SRC or DST segment. It is possible that it is predicted to match rule "A D," but comparison of the packet key 18 to that rule as fetched from the second memory 44 results in a miss. Simply generalizing from "A" to "a" will not solve this problem because "B" and "D" do not overlap. This results in a false negative, failing to identify the actual matching rule 22. This issue arises because of omitting important bits from the DST segments of the rules 22 when generating the corresponding fingerprints 38. A similar problem arises for the second case identified above, but not for the third case, as the rules 22 involved in that case share the same DST segment.

One solution addressing the first case is to add a new rule 22 to the set of rules 22 comprising the rules database 20; namely, add new rule "A B" to the set. The set becomes
Rule: a B
Rule: A B
Rule: A D
Similarly, add a new set for the second case:
Rule: a D
Rule: A D
Rule: A B Now consider a case with overlapping DST only. As an example first case:
Rule: A b
Rule: C B
In a second case:
Rule: A B
Rule: C b
And in a third case:
Rule: A b
Rule: A B Given A<C, at least one bit of the SRC segment is represented in the fingerprints 38 comprising the fingerprint database 36. Thus, any key "C ?" will never match the first case of "A b" in the above examples. Furthermore, assume the packet key 18 is predicted to match rule "C b" but the actual comparison results in no match—i.e., the prediction was a false positive. Notably, here the packet key 18 also will not match "A b." The same issue applies to the second case above, but not to the third case.

Now consider overlaps in both SRC and DST. In an example first case:
Rule: a b
Rule: A B Let <a-A> denote the IP segments that match "a" but not "A." Consider a key "<a-A>B." If the fingerprint-based prediction of possibly matching rules 22 ends on "a b," no generalizing is required. Otherwise, "A B" is falsely predicted. Generalizing on the SRC segment, "a" is found. However, "a B" is not in the rule set, as indicated by the bitmask previously discussed. However, the packet-processing engine 60 is configured to also generalize on the DST segment and it will thus find "a b" as the correct matching result.

Now for a key "A<b-B>," the predicted rule can be "A B" when none of the bits of the DST segment is represented in the fingerprints 38. However, after this possibly matching rule 22 is fetched, it will be determined not to match the packet key 18. Generalizing on the DST segment finds the correct match. Similar to the previous example, since "A b" is not in the rule set, the packet-processing engine 60 generalizes on the SRC to "a b" and finds the actual match.

A similar observation can be made on keys in the form of "<a-A><b-B>." Keys such as "c d," "A d," "a d," "C b," "C B," will not result in any match even after generalizing.

Consider the below example of rules 22:
Rule: a B
Rule: A b

Consider key "<a-A>B." If prediction goes "too far" in the search structure 40, traversal processing ends on "A b." Generalizing on the SRC segment results in a false match to rule "a b." To prevent this, there are two potential solutions. In a first embodiment, the packet-processing engine 60 uses a bitmask to indicate which combinations of SRC and DST segments are valid in terms of being part of the actual rule set. Alternatively, the packet-processing engine 60 adds another rule "A B," as a spawned rule of "a B." That is, the added rule 22 is associated with any action/policy/filter that "a B" is associated with. With both "A B" and "A b," at least one of the bits in the DST segment is represented in the rule fingerprints 38. Thus, when traversing the search structure 40, "<a-A>B" can potentially reach "A B" but never "A b." Generalizing on SRC thus yields the matching rule "a B."

Note that a key "A<b-B>" should be predicted to match "A b" but not "a B" and consider key "<a-A><b-B>" that should not match either of the two rules "a B" and "A b." Thus, predicting a match to the rule "a B," is a false positive. Generalizing on DST results in another false match with "a b." Similarly, predicting "A b" falsely results in generalizing on SRC to yield "a b."

If the fingerprint-based prediction points to "a B," generalizing on the DST segment "B" will still result in a false rule "a b." If "A B" is predicted, generalizing on both SRC and DST will also yield a false positive. The prediction of "A b" can also produce a false positive.

Figure 14:
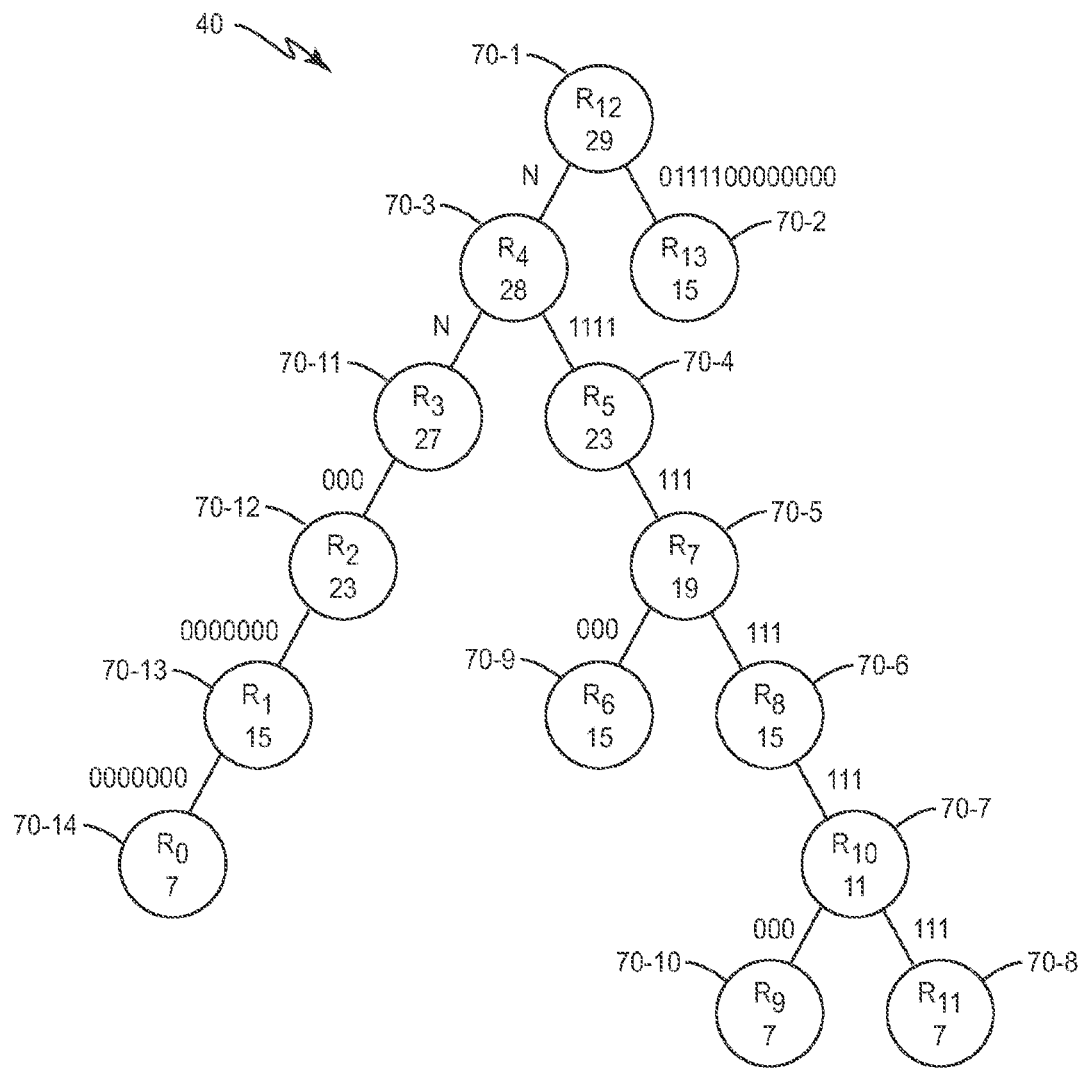

Another approach to mitigate these and other complications associated with backtracking on the search structure 40 in the LPM lookup, is that prefixes be embedded in the search structure nodes 70 or are equivalently embedded along the edges. In an example embodiment of such a method, the packet-processing engine 60 stores part of the prefix information on the search structure nodes 70, or from another perspective, this information is stored along the edges. Generation of the search structure 40 follows the same basic procedure as outlined before for LPM lookup, including the preprocessing of the rule set for all-zero rules, rules 22 that share the same values but have different prefix length, etc. FIG. 14 illustrates an example search structure 40 for this embodiment.

Denote N1, N2 as two nodes 70, and denote L1, L2 as their represented bit positions, respectively. N2 is a child node of N1 and L1>L2 always hold true based on how the search structure 40 is constructed. Now, if L1-L2>0, the packet-processing engine 60 stores the partial prefix of N2 between L1 and L2 bit positions on the edge connecting N1 and N2. For example, consider Node {R4:28} in the search structure 40, {R5:23} is the right child, the 24th through 27th bits of R5 are "1111," and for the left child {R3:27}, there is no need to store any partial prefix on the edge (since the two nodes hold the adjacent bit positions). Note that, the left edge still indicates a "0" in the parent node position, and right indicates "1."

Now consider an example that would have traversed all the way down to the bottom of the search structure 40 (to R9, R11). In particular, consider a packet key 18 of 0x10.88.88.80. This packet key 18 has 0 1 1 1 1 1 1 1 at its 29, 28, 23, 19, 15, 11, and 7 bit positions, which are extracted as characteristic bits 50 for traversal in the search structure 40. Then the traversal from the root node (R12) goes left (R4), right (R5), right (R7), right (R8), right (R10), right (R11), and stays on R11 because its 7th bit is "1." When the packet-processing engine 60 compares this key with all the rules 22, it can quickly conclude that this subject packet key 18 does not match any rules 22.

The first eight bits are 0x10, and all the rules 22 have at least a prefix length of eight, but none matches this first eight bits. With the partial prefixes stored in the search structure 40, the traversal becomes as follows: starting from the root (R12), check the left edge, and no partial prefix is stored there; after reaching R4, check against the prefix "1111" on right edge from R4. Because the key's 28th bit is 1, the prediction ends on R4. The corresponding actual rule 22 is fetched from the second memory 44 but is rejected as "no match." During this process, two nodes 70 and two edges are examined, in contrast to seven nodes in the previous LPM lookup method that did not use the partial prefix.

Now consider a matching example of 0x1F.F0.80.00. Starting from the root R12, traversal goes downward and leftward because the 29th bit is 0. This leads to the empty "left" edge from the root, reaching R4. Because the key's 28th bit is 1, processing continues with checking the right edge. A matching edge "1111" leads on to R5. The 23rd bit is 1, and processing thus continues rightward, matching "111" for the 20th-22nd bits. A "0" at the 19th bit position for R7 directs processing to the left edge value of "000." Continuing with this matching, the prediction reaches R6.

Figure 15:
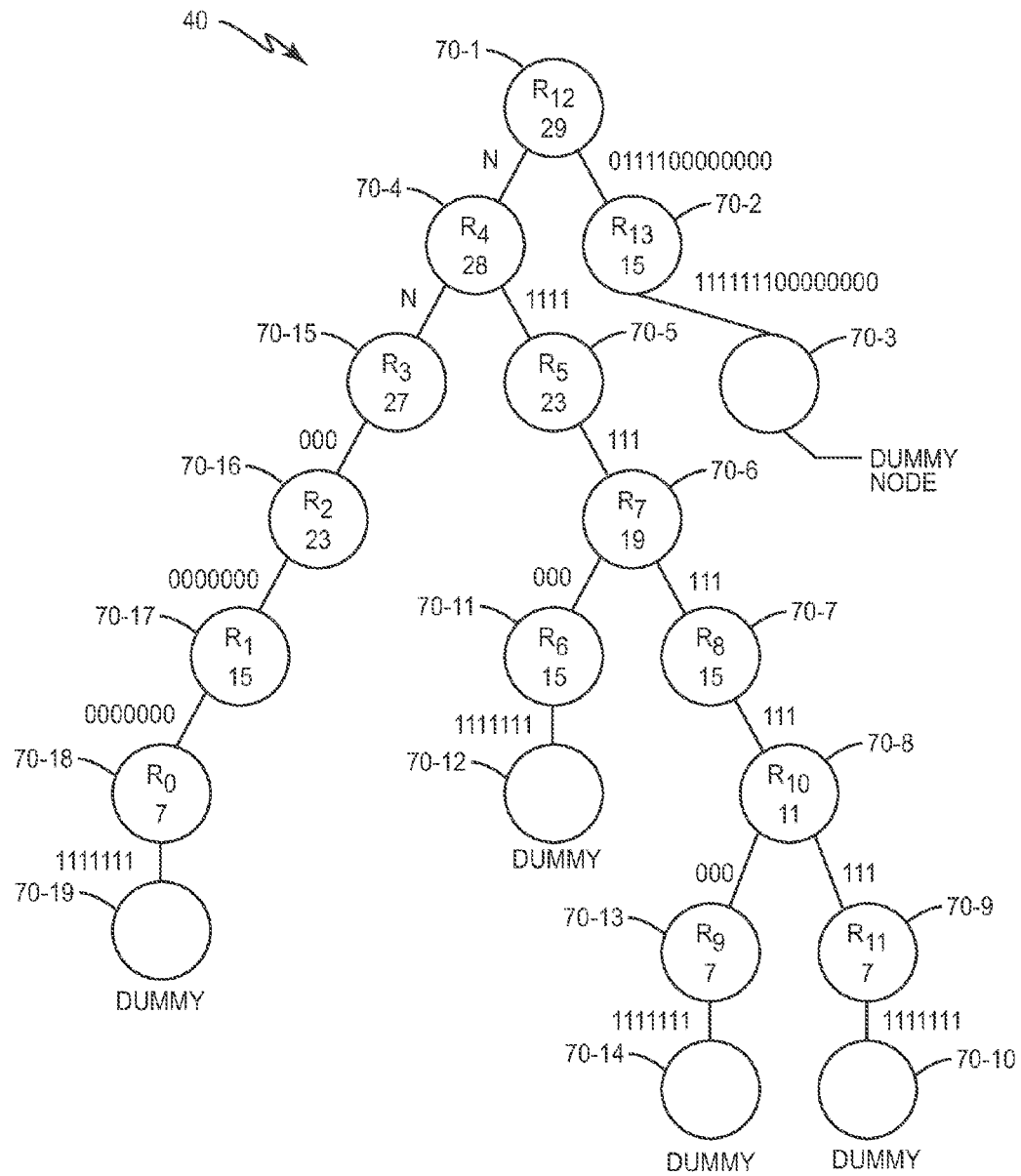

An issue here is the 15th bit is a 1, so the predicted rule is R6. However, the rule 22 that actually matches is R5, i.e., 0x1F.F0.00.00/12. This issues represents the same sort of backtracking that introduction of partial prefixes into the search structure 40 is intended to avoid. One solution is to add one more edge for all leaf nodes 70 (terminal nodes) in the search structure 40. The packet-processing engine 60 can store any remaining rule prefixes of each leaf node 70 on the edge leading to a dummy child node 70. An example search structure 40 is shown in FIG. 15.

For example, R0 is 0x00.00.00.FF/32 and the packet-processing engine 60 thus may "put" the remaining "1111111" from the 6th position of R0. For R6, the prefix length is 24, so the remaining bits are from 14th to the 18th bit positions, which is "1111111."

Now reconsider the example key of 0x1F.F0.80.00. Searching for this case reaches {R6:15} as a leaf node 70. Besides the 15th bit being "1," the remaining bits must also match in order for the node to be predicted as corresponding to a possibly matching rule 22. The testing key is "0000000" for the 14th down to the 8th bit, which does not form a match. Thus, the packet-processing engine 60 must backtrack on the search structure 40, first to {R7:19}, where it finds a "0" at the 19th bit of 0x1F.F0.80.00, and continuing on to {R5:23}, which turns out to be the eventual matching rule 22.

Note that a fingerprinted bit position cannot exceed beyond the range of the prefix. To appreciate the reason for this constraint, suppose two neighboring rules in the sorted set of rules 22 are Rule N: P1'.P2'.P3'.P4'
Rule N+1: P1.P2.P3.P4

Further suppose that the prefix length of Rule N+1 is 24. Here, P4==0. (A non-zero P4 yields the same rule, but the packet-processing engine 60 may be configured to enforce the use of zeros outside the prefix length). It is also known that Rule N is smaller because the set of rules 22 is sorted. If P4'=0, then a "1" is obtained by XOR in the first 24 bits, which is not beyond the prefix length 24. If P4' is not zero, then at least one of the following must hold true: P1'<P1, P2'<P2, or P3'<P3. Then a "1" can be obtained by XOR-ing within these 24 bits.

If the example key is slightly modified so that its beginning is "11" instead of "00" while keeping the 29th bit onward the same, then one obtains 0xDF.F0.80.00. Processing begins with a check of the 29th bit, and the algorithm thus traverses down the search structure 40 and backtracks twice, only to reach a prediction that proves not to be an actual match.

Figure 16:
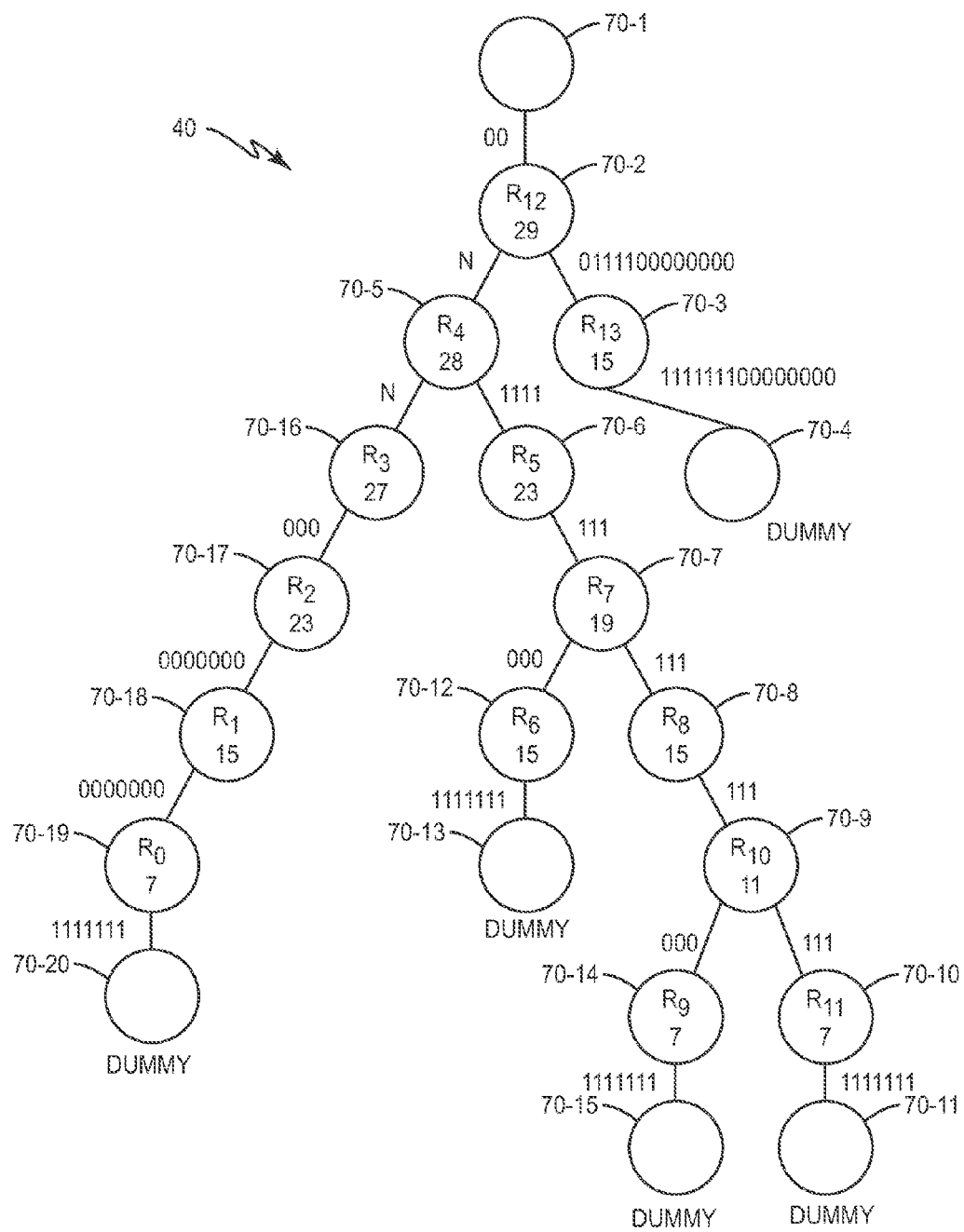

A simple way to prevent this is to add a dummy node 70 as the parent of the actual root node. FIG. 16 illustrates this case, where the real root node 70-2 has a dummy node 70-1 as its parent.

Of course, these examples consider only the 1-D, single-dimension case. For the 2-D algorithm, the packet-processing engine 60 may still use composite rules 22 obtained by concatenating the IP SRC and IP DST segments together. If all of the fingerprint bit positions are from the SRC segment of the rules 22, for construction of the search structure 40, then the degenerate case applies. That is, the DST is not represented in the fingerprints 38. This is an example of 1-D scenario. This is not an issue, though.

To see why, suppose that there are two neighboring rules 22 (after being sorted) in the set of rules 22 comprising the rules database 20 that share the same SRC segment. Consequently, the XOR operations only yield 1's for the DST segment. Such degeneration implies that each rule's SRC is different enough to be used alone to distinguish each other. The search algorithm is carried out in the same fashion.

That is, a prediction is made and the possibly matching rule 22 is fetched from the second memory 44. When the actual rule 22 is fetched, its SRC segment is compared with the corresponding segment of the packet key 18. If this comparison results in a mismatch, the DST segment need not be examined. Keep in mind, too, that this method eliminates backtracking. If the SRC segment matches, then the match or mismatch relies solely on the comparison on the DST segments. Once again, no backtracking is allowed at this stage and it takes only one try to determine the result.

Such degenerate cases do not necessarily simplify the processing contemplated herein, because the more generalized case must be handled. For the generalized case, the DST bits are also extracted in the rule fingerprints 38. Determination of the partial prefix differs for the 2-D case. For a parent node N1 $\{R_{N1}:L1\}$ and its child N2 $\{R_{N2}:L2\}$, if L1 is within the SRC segment and L2 the DST, then the packet-processing engine 60 concatenates the bits from (L1-1)-th to the end of the prefix length of SRC and the bits leading to L2-th of the DST segment. This way, the search structure 40 constructed for the 2-D composite rules 22 can be viewed as continued branching out from the dummy leaf nodes 70 of the 1-D case.

In general, those skilled in the art will appreciate that that rules fingerprinting taught herein is not dependent on the length of the processing rules and keys at issue, although its ability to represent even lengthy rules in a highly-compressed fingerprint database may become more advantageous as rule lengths increase. It should also be noted that modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of packet classification in a network node comprising: obtaining a packet key corresponding to a data packet received by the network node; identifying a packet processing rule or rules that are possible matches for the packet key by comparing characteristic bits of the packet key to rule fingerprints in a fingerprint database serving as a compressed representation of a rules database comprising a set of packet processing rules, said rule fingerprints comprising cut-point bits corresponding to bit positions in the packet processing rules that operate as search cut-points distinguishing between the rules or subsets of them, and wherein said characteristic bits of the packet key occupy bit positions corresponding to said cut-point bits, and further wherein the fingerprint database provides exact matching between packet keys and respective individual rules in the rules database, based on said method including preprocessing of the rules database to obtain the fingerprint database by: logically ordering the packet processing rules in the rules database in binary order; obtaining the bit positions of the most-significant bits produced from application of an exclusive-or operation to pairs of the packet processing rules taken in said binary order, wherein these bit positions are said cut-point bits, based on dividing and further subdividing the set of packet processing rules according to the cut-point bits taken in descending or ascending order, said search structure embodying said fingerprint database; fetching the identified packet processing rule or rules from the rules database; comparing the packet key with the fetched rule or rules; and indicating a rule hit or miss in dependence on whether the packet key matches any of the fetched rule or rules.

2. The method of claim 1, further comprising accessing the fingerprint database in an internal or other low-latency memory and accessing the rules database in an external or other high-latency memory, where the terms low-latency and high-latency are relative to each other.

3. The method of claim 2, wherein identifying the packet processing rule or rules that are possible matches for the packet key comprises a digital processor evaluating the fingerprint database as held in the internal or low-latency memory, and wherein fetching the identified rule or rules comprises the digital processor directly or indirectly retrieving the identified rule or rules from the rules database as held in the external or high-latency memory.

4. The method of claim 1, further comprising defining a search structure as a function of the cut-point bits of the fingerprint database and traversing the search structure as a function of the characteristic bits of the packet key, to identify the packet processing rule or rules that are possible matches for the packet key.

5. The method of claim 4, further comprising implementing the search structure as a Binary Tree, an N-way Tree, or as a Direct Indexing structure.

6. The method of claim 1, wherein identifying the packet processing rule or rules that are possible matches for the packet key comprises identifying a single packet processing rule as the only possible match for the packet key, or identifying a subset or range of the packet processing rules in the rules database that represent possible matches for the packet key.

7. The method of claim 1, further comprising, for purposes of classifying a given packet, accessing the rules database only for retrieval of the identified packet processing rule or rules.

8. The method of claim 1, wherein fetching the identified packet processing rule or rules from the rules database comprises retrieving a single rule from the rules database, for comparison matching to the packet key.

9. The method of claim 1, wherein the fingerprint database provides range matching between packet keys and respective ranges of individual rules in the rules database, based on said method including preprocessing of the rules database to obtain the fingerprint database by:
ordering the packet processing rules into non-overlapping ranges, with the lower ends of the non-overlapping ranges logically arranged in ascending order;
generating rule fingerprints by logically exclusive or-ing the lower-ends of each non-overlapping range; and
forming a search structure corresponding to the rule fingerprints, wherein each node in the search structure corresponds to one of the non-overlapping ranges.

10. The method of claim 9, wherein fetching the identified packet processing rule or rules from the rules database comprises retrieving multiple rules from a respective one of the non-overlapping ranges, for comparison matching of individual ones of the multiple retrieved rules to the packet key.

11. The method of claim 1, wherein the fingerprint database is based on ranges of rules having overlapping prefixes, and wherein the method further includes preprocessing of the rules database such that rules are stored in conjunction with index values corresponding to the rule or rules associated with the overlapping prefixes, and wherein identifying the packet processing rule or rules that are possible matches for the packet key comprises performing longest prefix matching and wherein retrieving the identified packet processing rule or rules comprises making one access to memory containing the rules database, to retrieve the rule associated with the longest prefix match, along with the index value or values corresponding to the rule or rules associated with the overlapping prefix.

12. The method of claim 1, wherein the fingerprint database is based on ranges of rules having overlapping prefixes, and wherein the method further includes storing in a search structure representing the fingerprint database those index values corresponding to the rule or rules associated with the overlapping prefixes, and wherein identifying the packet processing rule or rules that are possible matches for the packet key comprises performing longest prefix matching with respect to the search structure, including, responsive to traversing in said search structure beyond a child node for which there is a possible matching rule, using said index values to backtrack from the child node to a corresponding parent node representing a possibly matching rule.

13. The method of claim 1, wherein the fingerprint database is based on ranges of rules having overlapping prefixes, and wherein the method further includes storing in a search structure representing the fingerprint database those index values corresponding to the rule or rules associated with the overlapping prefixes, and wherein identifying the packet processing rule or rules that are possible matches for the packet key comprises performing longest prefix matching with respect to the search structure, to identify a range of rules to be fetched from the rules database for comparison matching with respect to the packet key.

14. A network node configured to route or switch packets in a packet network based on packet classification, said network node comprising: one or more communication interfaces configured to receive incoming packets for routing or switching processing, and to send outgoing packets according to switching or routing decisions made with respect to the incoming packets according to packet classification processing performed by the network node; and one or more processing circuits configured to perform said packet classification processing, based on being configured to: obtain a packet key corresponding to a data packet received by the network node; identify a packet processing rule or rules that are possible matches for the packet key by comparing characteristic bits of the packet key to rule fingerprints in a fingerprint database serving as a compressed representation of a rules database comprising a set of packet processing rules, said rule fingerprints comprising cut-point bits corresponding to bit positions in the packet processing rules that operate as search cut-points distinguishing between individual rules or subsets of them, and wherein said characteristic bits of the packet key occupy bit positions corresponding to said cut-point bits; and further wherein the fingerprint database is configured to provide exact matching between packet keys and respective individual rules in the rules database, based on said one or more processing circuits being configured to preprocess the rules database, for subsequent use in packet classification processing, to obtain the fingerprint database based on being configured to; logically order the packet processing rules in the rules database in binary order; obtain the bit positions of the most-significant bits produced by application of an exclusive-or operation to pairs of the packet processing rules taken in said binary order, wherein these bit positions are said cut-point bits; and form a search structure corresponding to a listing of the cut-point bits, based on dividing and further subdividing the set of packet processing rules according to the cut-point bits take in descending or ascending order; fetch the identified packet processing rule or rules from the rules database; compare the packet key with the fetched rule or rules; and indicate a rule hit or miss in dependence on whether the packet key matches any of the fetched rule or rules.

15. The network node of claim 14, wherein the one or more processing circuits are configured to classify a given received packet for switching or routing as a corresponding outgoing packet, based on processing the given received packet according to the fetched packet rule matching the packet key of the given received packet.

16. The network node of claim 14, wherein the network node includes a digital processing circuit configured to perform said identification of the packet processing rule or rules that possibly match the packet key, and to perform said comparison of the fetched rule or rules with the packet key, and wherein the network node further includes:
   a first memory for storing the fingerprint database, said first memory being internal to said digital processing circuit or otherwise accessible to said digital processing circuit at a first latency; and
   a second memory for storing the rules database, said second memory being external to said digital processing circuit or otherwise accessible to said digital processing circuit at said second latency that is high in comparison to said first latency.

17. The network node of claim 16, wherein said digital processing circuit is configured to fetch the identified packet processing rule or rules from said second memory.

18. The network node of claim 14, wherein the one or more processing circuits are configured to define a search structure as a function of the cut-point bits of the fingerprint database and traverse the search structure as a function of the characteristic bits of the packet key, to identify the packet processing rule or rules that are possible matches for the packet key.

19. The network node of claim 14, wherein the one or more processing circuits are configured to identify the packet processing rule or rules that are possible matches for the packet key based on being configured to identify a single packet processing rule as the only possible match for the packet key, or to identify a subset or range of the packet processing rules in the rules database that represent possible matches for the packet key.

20. The network node of claim 14, further wherein, for purposes of classifying a given received packet, said one or more processing circuits are configured to access the rules database only for retrieval of the identified packet processing rule or rules.

21. The network node of claim 14, wherein the one or more processing circuits are configured to fetch the identified packet processing rule or rules from the rules database based on being configured to retrieve a single rule from the rules database, for comparison matching to the packet key.

22. The network node of claim 14, wherein the fingerprint database is configured to provide range matching between packet keys and respective ranges of individual rules in the rules database, based on said one or more processing circuits being configured to preprocess the rules database to obtain the fingerprint database, based on being configured to:
   order the packet processing rules into non-overlapping ranges;
   generate a rule fingerprint corresponding to a lower-end of each non-overlapping range; and
   form a search structure corresponding to the rule fingerprints.

23. The network node of claim 22, wherein said one or more processing circuits are configured to fetch the identified packet processing rule or rules from the rules database based on being configured to retrieve multiple rules from a respective one of the non-overlapping ranges, for comparison matching of individual ones of the multiple retrieved rules to the packet key.

24. The network node of claim 14, wherein the fingerprint database is based on ranges of rules having overlapping prefixes, and wherein the one or more processing circuits are configured to preprocess the rules database such that rules are stored in conjunction with index values corresponding to the rule or rules associated with the overlapping prefixes, and to identify the packet processing rule or rules that are possible matches for the packet key based on being configured to perform longest prefix matching and to retrieve the identified packet processing rule or rules by making one access to memory containing the rules database, to retrieve the rule associated with the longest prefix match, along with the index value or values corresponding to the rule or rules associated with the overlapping prefix.

25. The network node of claim 14, wherein the fingerprint database is based on ranges of rules having overlapping prefixes, and wherein the one or more processing circuits are configured to store in a search structure representing the fingerprint database those index values corresponding to the rule or rules associated with the overlapping prefixes, and to identify the packet processing rule or rules that are possible matches for the packet key by performing longest prefix matching with respect to the search structure, including, responsive to traversing in said search structure beyond a child node for which there is a possible matching rule, using said index values to backtrack from the child node to a corresponding parent node representing a possibly-matching rule.

26. The network node of claim 14, wherein the fingerprint database is based on ranges of rules having overlapping prefixes, and wherein the one or more processing circuits are configured to store in a search structure representing the fingerprint database those index values corresponding to the rule or rules associated with the overlapping prefixes, and wherein identifying the packet processing rule or rules that are possible matches for the packet key comprises performing longest prefix matching with respect to the search structure, to identify a range of rules to be fetched from the rules database for comparison matching with respect to the packet key.

* * * * *

UNITED STATES PATENT AND TRADEMARK OFFICE
CERTIFICATE OF CORRECTION

PATENT NO. : 8,879,550 B2  
APPLICATION NO. : 13/466984  
DATED : November 4, 2014  
INVENTOR(S) : Anand et al.

Page 1 of 1

It is certified that error appears in the above-identified patent and that said Letters Patent is hereby corrected as shown below:

In the specification

Column 16, Line 42, delete "walking"" and insert -- walking". --, therefor.

In the claims

Column 23, Line 63, Claim 1, delete "cut-points bits," and insert -- cut-points bits; and forming a search structure corresponding to a listing of the cut-point bits, --, therefor.

Column 25, Lines 57-58, Claim 14, delete "configured to;" and insert -- configured to: --, therefor.

Column 25, Line 66, Claim 14, delete "take in" and insert -- taken in --, therefor.

Signed and Sealed this  
Sixth Day of October, 2015

Michelle K. Lee  
*Director of the United States Patent and Trademark Office*